United States Patent
Naudus

(10) Patent No.: US 6,259,691 B1
(45) Date of Patent: Jul. 10, 2001

(54) SYSTEM AND METHOD FOR EFFICIENTLY TRANSPORTING DUAL-TONE MULTI-FREQUENCY/MULTIPLE FREQUENCY (DTMF/MF) TONES IN A TELEPHONE CONNECTION ON A NETWORK-BASED TELEPHONE SYSTEM

(75) Inventor: Stanley T. Naudus, Springfield, VA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/122,201

(22) Filed: Jul. 24, 1998

(51) Int. Cl.[7] .............................. H04J 3/12; H04M 11/00; H04L 12/66

(52) U.S. Cl. ..................... 370/352; 370/356; 370/401; 370/526; 379/88.17; 379/88.24; 379/93.26; 379/418

(58) Field of Search ................................... 370/352, 353, 370/354, 356, 389, 522, 525, 526, 401, 465; 379/6.27, 31, 88.16, 88.17, 88.22, 88.23, 88.24, 93.01, 93.26, 219, 220, 229, 235, 360, 361, 418

(56) References Cited

U.S. PATENT DOCUMENTS

| | | | |
|---|---|---|---|
| 4,387,424 | 6/1983 | Frediani et al. | 709/225 |
| 4,471,427 | 9/1984 | Harris | 710/22 |
| 4,590,551 | 5/1986 | Mathews | 711/150 |
| 4,815,128 | * 3/1989 | Malek | 380/9 |
| 4,825,354 | 4/1989 | Agrawal et al. | 707/10 |
| 5,142,623 | 8/1992 | Staab et al. | 709/236 |
| 5,218,680 | 6/1993 | Farrell et al. | 709/215 |
| 5,291,479 | 3/1994 | Vaziri et al. | 370/264 |

(List continued on next page.)

FOREIGN PATENT DOCUMENTS

| | | |
|---|---|---|
| 0 946 034 A2 | 9/1999 | (EP) . |
| WO 97/23078 | 6/1997 | (WO) . |

OTHER PUBLICATIONS

International Search Report for PCT Applications Serial Number PCT/US99/16456, Dated Feb. 2, 2000.

"RTP: A Transport Protocol for Real–Time Applications" H. Schulzrinne et al., Lawrence Berkeley National Laboratory, Jan., 1996.

(List continued on next page.)

*Primary Examiner*—Alpus H. Hsu
(74) *Attorney, Agent, or Firm*—McDonnell Boehnen Hulbert & Berghoff

(57) ABSTRACT

A method and system in a network telephony system for transporting audio signals with lower delay when DTMF is not present. The method of transporting audio signals determines whether DTMF signals are included in the audio signal, or are likely to be transported according to the called or calling parties. A delay is imposed in the audio when DTMF signals are sensed or determined to be present as indicated by the calling party, the destination telephone number, the called party, and various other indicators. A timer may be used to trigger a reduction and elimination in the audio delay after an initial period in the call for calls in which DTMF signaling is used for an initial period of the call. The timer may also trigger the reduction and elimination in the audio delay when no DTMF signals have been received after a period of time. The system uses a DTMF detector to sense DTMF signals in the audio signal and to signal the delay generator to impose a delay in the audio stream. The delay generator may impose the delay by elongating the time between talk-spurts or by inserting fill packets in the audio stream. The delay may be removed from the audio stream when DTMF is not likely to be present.

34 Claims, 7 Drawing Sheets

U.S. PATENT DOCUMENTS

| | | | |
|---|---|---|---|
| 5,295,133 | | 3/1994 | Jurkevich ............................ 370/219 |
| 5,410,754 | | 4/1995 | Klotzbach et al. .................. 370/466 |
| 5,412,660 | | 5/1995 | Chen et al. ......................... 370/318 |
| 5,517,556 | | 5/1996 | Pounds et al. .................... 379/88.25 |
| 5,528,595 | | 6/1996 | Walsh et al. ........................ 370/402 |
| 5,577,105 | | 11/1996 | Baum et al. ...................... 379/93.05 |
| 5,732,130 | * | 3/1998 | Iapalucci et al. ................... 379/207 |
| 5,737,331 | | 4/1998 | Hoppal et al. ...................... 370/349 |
| 5,999,592 | * | 12/1999 | Sestak ................................. 379/14 |
| 6,097,804 | * | 8/2000 | Gilbert et al. ...................... 379/230 |

OTHER PUBLICATIONS

"ITU–T Draft Recommendation H.223/Annes A" Peter Vogel, International Telecommunication Union, Jul., 1996.

"Pulse Code Modulation (PCM) of Voice Frequencies" International Telecommunication Union, 1993.

"Video Coding for Low Bit Rate Communication" International Telecommunication Union, 1996."Video Codec for Audiovisual Services at p×64 kbits" International Telecommunication Union, 1994.

"Draft H.225.0, Version 2" International Telecommunication Union, Jun. 11, 1997.

"Dual Rate Speech Coder for Multimedia Communications Transmitting at 5.3 and 6.3 kbit/s" International Telecommunication Union, 1996.

"RTP Profile for Audio and Video Conferences with Minimal Control" H. Schulzrinne, GMD Fokus, Jan., 1996.

"Recommendation H.234—Version 2" International Telecommunication Union, Mar. 24, 1997.

* cited by examiner

SYSTEM AND METHOD FOR EFFICIENTLY TRANSPORTING DUAL-TONE MULTI-FREQUENCY/MULTIPLE FREQUENCY (DTMF/MF) TONES IN A TELEPHONE CONNECTION ON A NETWORK-BASED TELEPHONE SYSTEM

A. FIELD OF THE INVENTION

The present invention relates to telephony services using the Internet as a transport medium, and more particularly to carrying dual-tone multi-frequency/multiple frequency (DTMF/MF) for signaling in telephone connection on Internet telephony systems. DTMF/MF tones are typically used for signaling in telephone connections on POTS systems.

B. BACKGROUND OF THE INVENTION

The Internet can be a desirable alternative to those telephone users who wish to save on their telephone bills and can tolerate the occasional delays and dropouts or loss of quality of service due to data traffic congestion on the public Internet. Voice telephone calls over a network such as the Internet, referred to as Voice-over-IP ("VoIP"), allows callers to converse over the telephone with only limited use of the Public Switched Telephone Network ("PSTN") or General Switched Telephone Network ("GSTN") equipment provided by the local and long distance service providers. Rather than using the GSTN, VoIP calls are carried over the public Internet, thereby substantially avoiding the fees and charges levied by the long distance service providers who provide the GSTN equipment and service.

The GSTN establishes traditional circuit-switched connection between callers to continuously carry voice signals between the callers. A caller wishing to speak with another telephone subscriber picks up the telephone and dials the telephone number of the subscriber with which he is wishing to speak. According to the dialed telephone number, the GSTN establishes a circuit-switch connection using the telephony signaling and control protocols that have been established to setup dedicated circuit-switched connections over the hierarchy of switches and transmission equipment provided by the GSTN. The circuit-switched connection established by the GSTN is dedicated to one call that has exclusive access to the connection for the duration of the call.

In comparison to the dedicated circuit-switched connections established by the GSTN, computer networks such as the Internet provide voice communications, as well as multimedia communication such as text, graphics, video and audio, over a packet-based network. Rather than establishing a dedicated circuit-switch connection through the GSTN, a VoIP call establishes a virtual call connection between the two callers through the system of interconnected packet-based networks ("PBN") that make up the Internet, intranets and other digital networks that provide connectivity between users. The voice or multimedia information is broken up into packets that are transmitted over the different networks that carry the virtual connection.

In order to facilitate communication using the Internet, industry and international standards bodies have established sets of functional requirements, conventions or rules that govern the transmission of data over both telephone and packet switched computer networks. These functional requirements or rules are known in the art as "protocols." The implementation of protocols is necessary in order to bring order, and standardization, to the communications field and allow equipment of diverse manufacturers to be interoperable.

Some protocols are considered low level transmission media-related modulation protocols, such as modulation schemes implemented in a modem, for example V.34, V.22 bis, etc. Other protocols are considered higher level, and relate to such features as error control, transmission control protocols and network level routing and encapsulation of data. Examples of such protocols are the Point-to-Point Protocol (PPP), the Serial Line Interface Protocol (SLIP), and the Real-time Transport Protocol (RTP). The requirements of these latter protocols are typically prepared as a RFC "Request For Comment" document, circulated among and adopted by the industry. Sometimes other standards bodies such as the ITU eventually adopt the IETF standards as their standards as well. As an example, RTP (RFC-1889) has been placed into the ITU's H.225.0.

Developers have applied the various functions defined in protocols to develop devices and systems that improve the performance and capabilities of the Internet as well as of other types of data networks. One such device is a "gateway". Gateways allow dissimilar computer networks using different protocols and transmission rate capacities to interconnect by providing an interface that translates data between the different network formats. For example, one type of gateway is an Internet telephony gateway. An Internet telephony gateway is capable of receiving simultaneous incoming calls from the Public Switched Telephone Network and routing them to a data network. Internet telephony gateways may be used in VOIP systems, or Internet telephony systems, which permit virtual call connections for VOIP calls.

In VOIP calls, a first caller may place a telephone call using the caller's telephone or computer modem to a local Internet telephony gateway, which is connected to a PBN. The local gateway establishes one or more Internet sessions with a remote Internet telephony gateway. The remote gateway completes the virtual call connection by connecting to the second caller over a local telephone connection on the GSTN.

In order to communicate audio signals in an Internet-based telephone system, the gateway uses the audio signals received from the parties' telephones over the telephone network. These audio signals are typically pulse code modulated (PCM) signals according to the international G.711 standard. Audio signals coded in G.711 may need to be transcoded to G.723.1 or G.729 compressed audio signals to conserve bandwidth. The compressed audio signals are packetized and communicated in streams of packets over the Internet.

While there are cost benefits to be enjoyed by placing VOIP calls as opposed to traditional GSTN switched calls, callers may have to adjust to telephone connections that are different from the POTS connections to which they are accustomed. The virtual call connection provided by the Internet telephony system is different from the POTS connections because the gateways and the PBN replace a substantially continuous conductive path between the parties' telephones. In a voice telephone connection, POTS telephones on GSTN switched calls use the continuous conductive path to conduct audio signals from one telephone to another with almost no data processing other than the possible conversion of the analog voice signals to digital signals. In a VOIP virtual call connection, the gateways process the voice signals using a variety of protocols.

Because of the data processing of the voice signals used in Internet telephony systems, many features of the GSTN that relied on the ability to conduct signals along a substantially continuous path are lacking. One such feature is the communication of dual-tone multi-frequency/multiple frequency (DTMF/MF, hereinafter DTMF) tones between parties to a virtual call connection. U.S. Pat. No. 5,577,105 "TELEPHONE CALL ROUTING AND SWITCHING TECHNIQUES FOR DATA COMMUNICATIONS" to Baum et al., which is fully incorporated herein by reference, discloses the use of DTMFIMF signals for configuring calls by correlating the signals with communications, routing or applications protocols. In Baum et al., however, the DTMF/MF signals are not transported between two telecommunications devices that are connected over the PBN.

One reason why the transporting of DTMF/MF signals is difficult is that the G.723.1 and G.729 coding is based on a model of the human voice. Coding or decoding errors may occur because voice signals may contain frequencies similar to the frequencies of the DTMF tones. Encoding the DTMF tones and audio signals as packetized G.711 may reduce errors; however, packetized G.711 would make inefficient use of the network bandwidth.

It would be desirable to reliably transport DTMF signals over a wide-area network telephony system without the additional burden on the network.

One solution is to transmit DTMF signals in their own stream. The DTMF signals may be encoded as digits, which may then be packetized in a data stream and transported separately, or out-of-band, from the audio signal that contains both voice and DTMF signals. This solution has other advantages in that the DTMF signals may be integrated functionally into the telephony implementation as control signals that may, for example, permit data entry during call setup.

One problem with this solution is that during the processing of the DTMF detection, a 30–60 ms. skew will develop between the audio stream and the DTMF stream. Further, since the DTMF is sent as a separate stream to the remote gateway, this separate DTMF may experience greater delay than the audio stream while they are both being sent over the Internet. This is because the DTMF may be sent over a reliable transport protocol such as TCP, and the audio stream may be sent over an unreliable transport stream such as UDP. When the two streams (audio and DTMF) arrive at the remote gateway, they may have enough skew between them to be interpreted as two separate DTMF signals instead of the actual one DTMF signal. For this reason, the local Gateway will need to not only detect DTMF (in the audio stream) and regenerate the DTMF signal (into the separate DTMF stream) but also remove the DTMF stream from the original audio stream.

This additional processing of removing the DTMF from the audio stream requires that an additional 30–60 ms. delay be inserted between the point at which the audio stream is received from the PSTN at the Gateway and the point at which the audio stream is sent out to the Internet as packetized audio. This delay is necessary to permit detection and removal of DTMF signals from the audio signal. The problem with delaying the audio stream to detect and remove the DTMF from the audio stream is that a 30–60 ms. delay would result in a total round-trip delay of 60–20 ms. The human hearing can perceive a delay of about 300 ms. Because other processing will add additional fixed delay, it may not be acceptable to tolerate the 60–120 round trip delay.

Due to voicemail and services that use integrated voice response systems, telephony system should be able to reliably transport DTMF signals. It would be desirable for an Internet telephony system to provide the same capabilities as the POTS system. It would be particularly desirable to transport DTMF signals in a wide-area network telephony system without having to substantially delay the audio signal.

SUMMARY OF THE INVENTION

In view of the above, a network-based telephone system is provided for connecting a first telecommunications device and a second telecommunications device over a packet-based network. The system includes a first gateway comprising a telephone network interface for receiving an audio signal from the first communications device via a public switched telephone network when a telephone connection has been established between the first and second telecommunications devices. A dual-tone multi-frequency (DTMF) and audio controller detects a DTMF signal in the audio signal, removes the DTMF signal from the audio signal and generates a delay in the audio signal. An audio encoder creates an audio stream for transporting over the packet-based network. A network interface converts the audio stream into an audio session, and transports the audio session over the packet-based network.

A second gateway receives the audio session. The second gateway is communicably connected to the second communications device via a second telephone network interface. The second gateway translates the audio session into a received audio signal and transmits the received audio signal to the second communications device.

In a further aspect of the present invention, the first gateway may communicate the DTMF signals over a DTMF stream to the second gateway.

The present invention is further directed to a method for efficiently transmitting an audio signal over a network-based telephone in a system comprising a first and second telecommunications device. The first telecommunications device generates voice signals and dual-tone multi-frequency (DTMF) signals in the audio signal. The first and second telecommunications devices are connected to a packet-based network. According to the method, the system detects a DTMF signal and generates a delay when the DTMF signal is detected. An audio stream for transporting over the packet-based network is created using the audio signal. The audio stream is transported without the audio delay when no DTMF signal is detected. When a DTMF signal is detected, the DTMF stream and the audio stream are transported over the packet-based network with an audio delay in the audio stream. The DTMF and audio streams are received at the second gateway with the received audio signal approximately aligned with the received DTMF signal if no skew has occurred while in transit over the packet-based network.

According to one object of the present invention, the audio and DTMF signals are efficiently transported without a skew between the signals due to the processing of the DTMF signals. In another object of the present invention, the audio delay that compensates for the DTMF skew is not present and, therefore, does not consume the delay budget when DTMF signals are not being transported.

These and many other advantages and features of the invention will become more apparent from the following detailed description of presently preferred embodiments of the invention.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF THE PREFERRED EMBODIMENT

A. Internet Telephony System

Preferred embodiments of the present invention may be performed using a telephony system that is implemented on a wide-area network. In a wide-area network-based telephony system, users of telecommunications devices are connected over the wide-area network instead of over the public-switched telephone network. Examples of such telephony systems may be found in U.S. patent application Ser. No. 08/970,834, "DISTRIBUTED PROCESSING OF HIGH LEVEL PROTOCOLS, SUCH AS REAL TIME TRANSPORT PROTOCOLS, IN A NETWORK ACCESS SERVER" to Daniel Schoo et al., which is hereby incorporated by reference. In the system in Schoo et al., telecommunications devices may connect via the telephone network to a gateway. The gateway converts audio and video signals to separate audio and video streams in H.323 format. The streams are transported over the Internet to H.323 computers connected to the Internet. The systems disclosed in Schoo et al. are particularly suited for use in real-time video conferencing.

The patent to Dale M. Walsh et al., U.S. Pat. No. 5,528,595, which is fully incorporated by reference herein, describes an integrated gateway suitable for connecting the public switched telephone network to a data network such as the Internet. Such a device has been commercialized widely by 3Com Corporation (previously U.S. Robotics Corp.) under the trade designation Total Control™ Enterprise Network Hub. gateways similar in functionality, architecture and design are available from other companies, including Ascend Communications, Livingston Enterprises, Multitech, and others.

Figure 1:
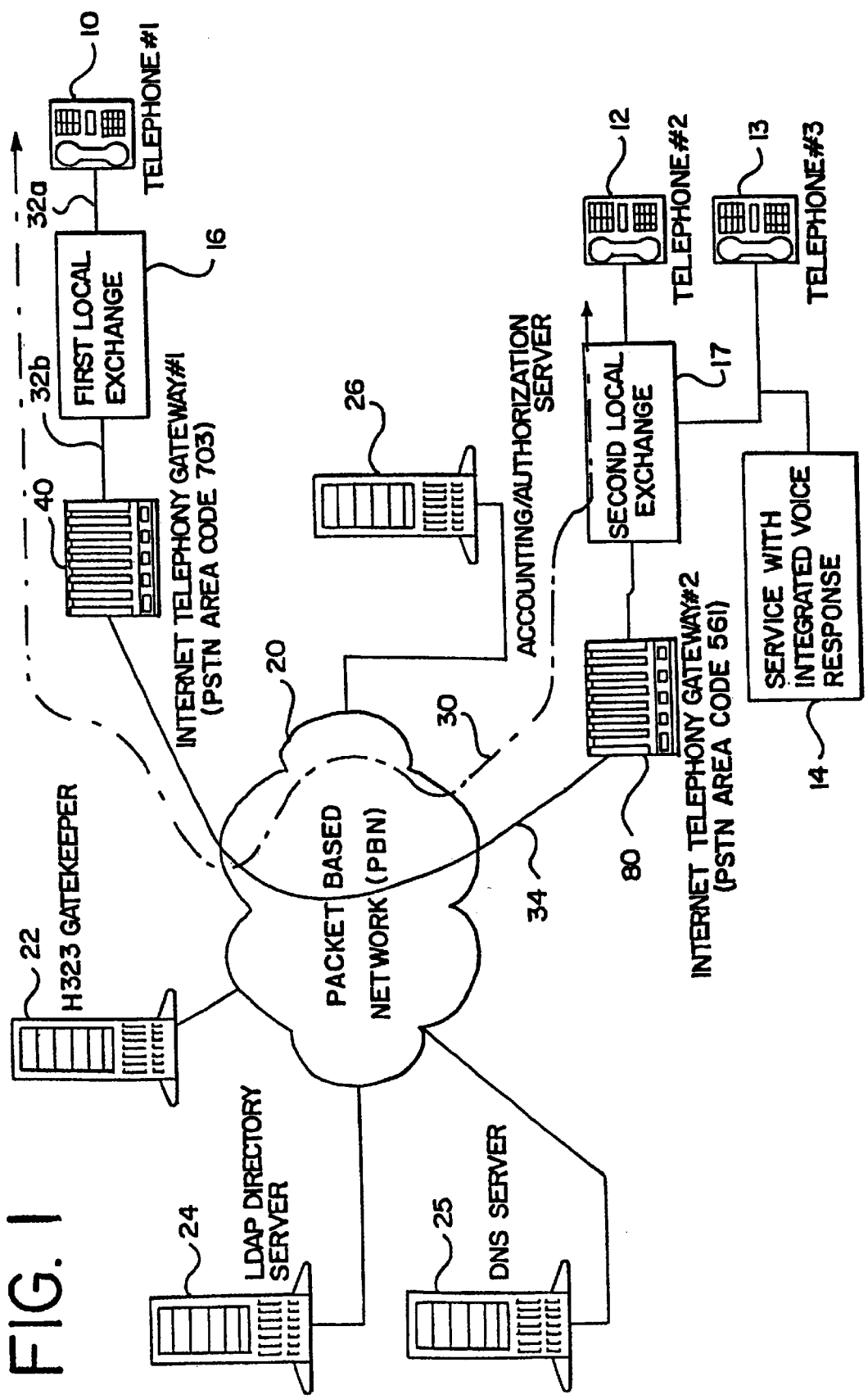
FIG. 1 is a high level diagram of a network-based telephony system in which the present invention finds particular use.

FIG. 1 is a block diagram of a network-based telephony system of a type in which the present invention finds particular use. It is to be understood by one of ordinary skill in the art that, although the description below is directed at using the Internet as a wide-area network in preferred embodiments, any wide area network capable of transporting data representing real-time audio signals may be used as well. One of ordinary skill in the art would know how to make the appropriate modifications to the example embodiments described below.

One category of modifications that may be addressed by one of ordinary skill in the art involves the protocols selected for processing the data and signals communicated. Preferred embodiments make use of the following protocols and standards as discussed in the description that follows:

ITU-T Recommendation G.711 (1988) "Pulse Code Modulation (PCM) of Voice Frequencies."

ITU-T Recommendation G.723.1 "Dual Rate Speech Coder for Multimedia Communications Transmitting at 5.3 and 6.3 Kbit/s"

ITU-T Recommendation H.323 "Visual Telephone Systems and Equipment for Local Area Networks Which Provide a Non-Guaranteed Quality of Service"

ITU-T Recommendation H.225.0 (1996), "*Media Stream Packetization and Synchronization on Non-Guaranteed Quality of Service LANs.*"

RFC 1889: RTP: A Transport Protocol for Real-Time Applications, Jan. 25, 1996

RFC 1890: RTP Profile for Audio and Video Conferences with Minimal Control, Jan. 25, 1996

ITU-T Recommendation Q.931 Digital Subscriber Signaling System No.1 (DSS 1)-ISDN User-Network Interface Layer 3 Specification for Basic Call Control ITU-T Recommendation H.245 Control Protocol for Multimedia Communication Handley, M., Schooler, E., and H. Shulzrinne, "Session Initiation Protocol ("SIP")", Internet-Draft (draft-ieft-mmusic-sip-06.txt) Work in Progress ITU-T Draft Recommendations H.332 (1998), *Loosely Coupled H.323 Conferencing*

The documents listed above are incorporated by reference.

It is to be understood by one of skill in the art that any reference made to the protocols listed above in the description below are by way of example. Preferred embodiments may use these protocols to take advantage of the wide acceptance of the protocols in the industry. One of ordinary skill in the art will understand that alternatives not listed above may also be used when appropriate.

Referring to FIG. 1, a network-based telephony system may include a first telecommunications device 10 connected, via a first local exchange 16 of the public switched telephone network ("telephone network") to a first Internet Telephony gateway ("gateway") 40. The first gateway 40 is connected to a packet-based network ("PBN") 20, which communicates to other users of the network via gateways such as a second gateway 80. The second gateway 80 communicates via a second local exchange 17 to the telephone network with other telecommunications devices 12, 13, 14.

The other telecommunications devices 10, 12, 13, 14 may include any device capable of communicating audio signals over the telephone network. For example, the other telecommunications devices may include telephones 12, 13 and a service with integrated voice response 14. Examples of services with integrated voice response 14 include voice mail or other message maintenance services, banking services performed by telephone, order processing services that permit purchasing merchandise by telephone, and any other service offered by an enterprise that may use DTMF signals as user input in response to voice prompts. Any of the telecommunications devices 10, 12, 13, 14 may also include PBXs, computers and other equipment with a telephone network interface.

The first gateway 40 is connected to a WAN such as PBN 20 that communicates to other networks via a gateway, such as the second Internet Telephony gateway 80. The gateways 40, 80 are connected to the well-developed Internet infrastructure by means of a network connections 34 preferably capable of supporting and implementing the well-known TCP/IP and UDP/IP protocols. The second gateway 80 communicates via the second LEX 17 with second telecommunications devices used by subscribers. The network-based telephone system provides a virtual call connection 30 over the PBN WAN 20 that is an alternative to the typical POTS telephone connection carried by the GSTN. The PBN WAN 20 in a preferred embodiment of the present invention is the Internet, one of the most commonly used WANs in the world. Alternatively, other computer networks such as a private IP network in a WAN or a LAN (local area network) configuration may also be used. In conjunction with the gateways, an Accounting/Authorization server 26 is used as a central database maintaining information relating to subscribers to a network-based telephony service to provide authentication of access to the PBN network.

The PBN 20 may use Internet resources such as an LDAP Directory Server 24 and a Domain Name Server 25 to obtain IP addresses for destination Internet Telephony gateways. Internet Telephony gateways provide the interfaces between each of the different types of networks the call connection must traverse. The Internet Telephony gateways may provide network access functionality between similar networks, such as interfacing a connection between two IP networks, and a gateway functionality to interface two different networks, such as a Netware IPX and an IP network. Thus, call connections can be provided between the caller's voice telephone to the computer network, between one computer network to a second computer network, and then between the second computer network to the called party's voice telephone, as will be described in more detail below.

In addition, gatekeeper 22 as described in connection with the ITU-T H.323 protocol or similar devices manage access to the PBN 20 and the routing of telephone calls between Internet Telephone gateways 40, 80. The gatekeeper 22 provides address translation and control access to the network for H.323 endpoints such as H.323 terminals, gateways and Multipoint Control Units ("MCU"). The gatekeeper 22 may also provide other services to the network such as ensuring network resources are available, allocating bandwidth, and allocation and locating destination gateways. Accounting/Authorization servers 26 may also provide similar functionality. Working together, Internet Telephony gateways 40, 80, gatekeepers 22 and Accounting/Authorization server 26 in connection with other networking devices such as switches, routers, access servers, determine and establish call connections for data to transverse the network from a source telephone, terminal or computer to a destination terminal or computer.

The first and second local exchanges 16, 17 are preferably the local exchanges of the first telecommunications device 10 and the second telecommunications devices 12, 13, 14, respectively. The first and second telecommunications devices 10, 12, 13, 14 connect to the local exchanges 16, 17 at connections 32a, 36b in conventional ways. For example, connections 32a and 32b to the first gateway 40 and connections 36a and 36b to the second gateway 80 may include an Integrated Services Digital Network (ISDN) connection. Alternatively, connection 32a may include typical connections to a central office (not shown) in the local exchange 16 and connection 32b may include a T1 or E1 line. In a preferred embodiment, gateway's 40, 80 include an interface that is capable of connecting by a T1, an E1 or an ISDN connection.

Referring to FIG. 1, a virtual call connection 30 may be made and used for communication between the first telephone 10, the second or third telephones 12, or the service having integrated voice response 14. Although the virtual call connection 30 may be made using a variety of different schemes, it would be desirable to mimic the way in which a user makes telephone calls over traditional service carriers.

In the discussion that follows, a caller uses the first telecommunications device 10 to make a VOIP virtual call connection to the second communications device 12. The first telecommunications device 10 is referred to as the local telecommunications device 10; the first gateway 40 is referred to as the local gateway 40; the second telecommunications device 12 is referred to as the remote telecommunications device 12; and the second gateway 80 is referred to as the remote gateway 80. It is to be understood by one of skill in the art that these designations are made for purposes of clarity in describing the call setup functions performed on the VOIP PBN system and are not intended to limit the capabilities and functionality of the components of the network.

1. Switch Dependent Gateway

A VOIP virtual call connection by using the local exchanges 16, 17 and other systems in the central offices in which they are located to provide caller authentication, caller authorization, billing and interactive voice prompts. In addition, switches that support provisioning modes that enable a telephone user to signal the switch to use an gateway for telephone service rather than the traditional telephone network are widely available in central offices.

To place a call using the switch dependent gateway, a caller dials to the central office switch of the first local exchange 16. Dialing may involve the use of A&B robbed bits to supply dial pulses by alternating the signaling bits between 0 and 1 to mimic rotary dial pulses (plus supervisory states including on-hook, off-hook, disconnect, and busy). In a preferred embodiment, dialing is accomplished by either using DTMF tones are multiplexed with the actual voice traffic on connection 32a, or by using ISDN PRI signaling.

The connection to the local gateway 40 may be established in a couple of ways. The caller may dial directly to a hunt group associated with the central office switch and get prompted via a pre-recorded announcement to provide the destination telephone number, user identification and Personal Identification Number (PIN). Alternatively, the central office switch may be provisioned to accept the destination telephone number upon receiving an access code from the caller. This access code allows the call to be forwarded along the outgoing trunk line (at connection 32b) to the local gateway 40.

Afterwards, the central office switch forwards the call (with the destination telephone number) to the gateway using either (1) ISDN PRI signaling with the destination (E.164) telephone number contained within a Q.931 Setup message (see description below); or (2) Channelized T1 signaling with the destination (using E.164, the standard for defining telephone numbers) telephone number supplied to the gateway using DTMF.

The central office switch at the first local exchange 16 supplies the destination telephone number to the local gateway 40 using either ISDN PRI or channelized T1 signaling at connection 32b. The local gateway 40 queries an address database to obtain a transport address of the remote gateway 80, which is the gateway nearest to the destination telephone number. This address database may be located on other devices besides the gateway 40. The address database may be located on the gateway's gatekeeper, such as gatekeeper 22, or on a standalone database server that may be accessed by either the gateway 40 or the gatekeeper 22. Regardless of where the address database is located, the local gateway 40 will perform any operation necessary to retrieve the transport address of the remote gateway 80.

With the transport address of the remote gateway 80, the local gateway 40 establishes an H.323 compliant connection 34a with the remote gateway 80 nearest to the called local exchange 17. The H.323 compliant connection 34 is a channel of data that according to the H.323 ITU-T Recommendation for visual telephone systems and equipment. The H.323 channel is carried over an Internet data connection. The connection 34 includes streams of data representing the audio signals according to the H.225.0 protocol for defining media stream packets. The connection 34 may be controlled by an interchange of control messages between the gateway's 40, 80. The control messages are preferably communicating in their own channel according to the H.245 control protocol for multimedia communication.

The connection 34 is created using the Q.931 protocol for setting up calls between the local gateway 40 and the remote gateway 80. For example, the local gateway 40 sends a Q.931 Setup message to the remote gateway 80. The local gateway 40 receives a Connect message from the remote gateway 80 to indicate acceptance of the call. The local gateway 40 may receive a Release Complete message to indicate refusal of the call.

During the creation of the connection 34, an H.245 TCP control channel is created for session control and capability exchange. The capability exchange may include terminal capability indication, master/slave determination and opening of the logical channels for audio in each direction.

The remote gateway 80 uses the destination telephone number received from the local gateway 40 to place a call to the destination telephone user through the central office of the second local exchange 17.

2. Switch Independent Gateway

The VOIP virtual call connection may also be made using a switch independent gateway. The local gateway 40 may include a call process driver (described below with reference to FIG. 3) to perform call authentication, call authorization, billing, interactive voice prompts and other call processing functions that a switch might normally perform. The call process driver may communicate with the gatekeeper 22 for call setup information such as the Internet transport address for the remote gateway 80 and for H.225.0 registration, admission and status information (RAS). The call process driver also includes an interactive voice response driver and a voice prompt driver to perform the call setup as described below.

The call setup process in the second embodiment is started when the first telecommunications device 10 signals the first local exchange 16 to initiate a phone call. The caller dials the hunt group of the local gateway 40 using either channelized T1 via DTMF or ISDN PRI signaling. The local gateway 40 determines a telephone connection is being attempted and plays out a recorded "Welcome" integrated voice response message followed by the "Billing" integrated voice response message request for the User/Payment Information. The calling phone user enters User/PIN/Payment Information using DTMF (e.g., using a touch-tone keypad). The local gateway 40 forwards the User/PIN/Payment Information to a separate process or to the gatekeeper 22 for Billing, and to the authentication/authorization server 26 for approval.

When the local gateway 40 receives approval, it plays out a recorded "Destination Phone Number" integrated voice response requesting for the destination phone number. The calling Phone User enters the destination phone number DTMF. The local gateway 40 may provide feedback of the status of the call to the calling user by playing a "Call is Being Setup" integrated voice response message. The local gateway 40 sends a RAS ARQ message to the gatekeeper 22 requesting the transport address of the remote gateway 80 that is connected to the destination telephone network party. The gatekeeper 22 responds with an admission confirmation message (ACF) specifying the remote gateway 80 to use. The gateway's 40, 80 should discover the gatekeeper 22 during an initialization phase of the gateway 40, 80. If the gateway 40, 80 does not know the gatekeeper's IP Address, then it should use the DNS 25 or the authorization/authentication server 26 to locate it.

The local gateway 40 establishes an H.225.0: Q.931 TCP channel between the local and remote gateways 40, 80 to carry the call setup messages. The local gateway 40 sends a Setup message to the remote gateway 80. The calling gateway receives a Connect message (or Release Complete indicating refusal of the call) from the remote gateway 80 indicating acceptance of the call. The local gateway 40 also establishes an H.245 TCP Control Channel between the local and remote gateways 40, 80 for call control and capability exchange. The capability exchange may include indicating terminal capabilities, master/slave determination, and signal opening logical channels for audio in each direction. The remote gateway 80 uses the destination E.164 address in the Setup message to place the outbound call. Once the destination telephone network connection 36a, 36b is made, the remote gateway 80 sends a connect message informing the local gateway 40 that a connection to the destination telephone network phone has been successfully made.

It is to be understood by one of skill in the art that alternative configurations may be used to implement VOIP calls in an Internet telephony system. One alternative configuration relates to the implementation of the H.323 protocol. The H.323 protocol is implemented in the system described above using two gateways sending Q.931 and H.245 signaling directly between them according to the "Direct Model" of operation. In an alternative embodiment, the signaling may be implemented using intermediate devices (such as gatekeepers) between the two gateways. For example, the gatekeeper 22 shown in FIG. 1 may be used by the local gateway 40 to communicate Q.931 and H.245 signaling to a second gatekeeper (not shown) which may then communicate with the remote gateway 80.

B. The Internet Telephony Gateway

The Internet telephony gateways 40, 80 in FIG. 1 are gateways with an application for Internet telephony. Examples of gateways are described in Schoo et al. and in Walsh et al.

Figure 2:
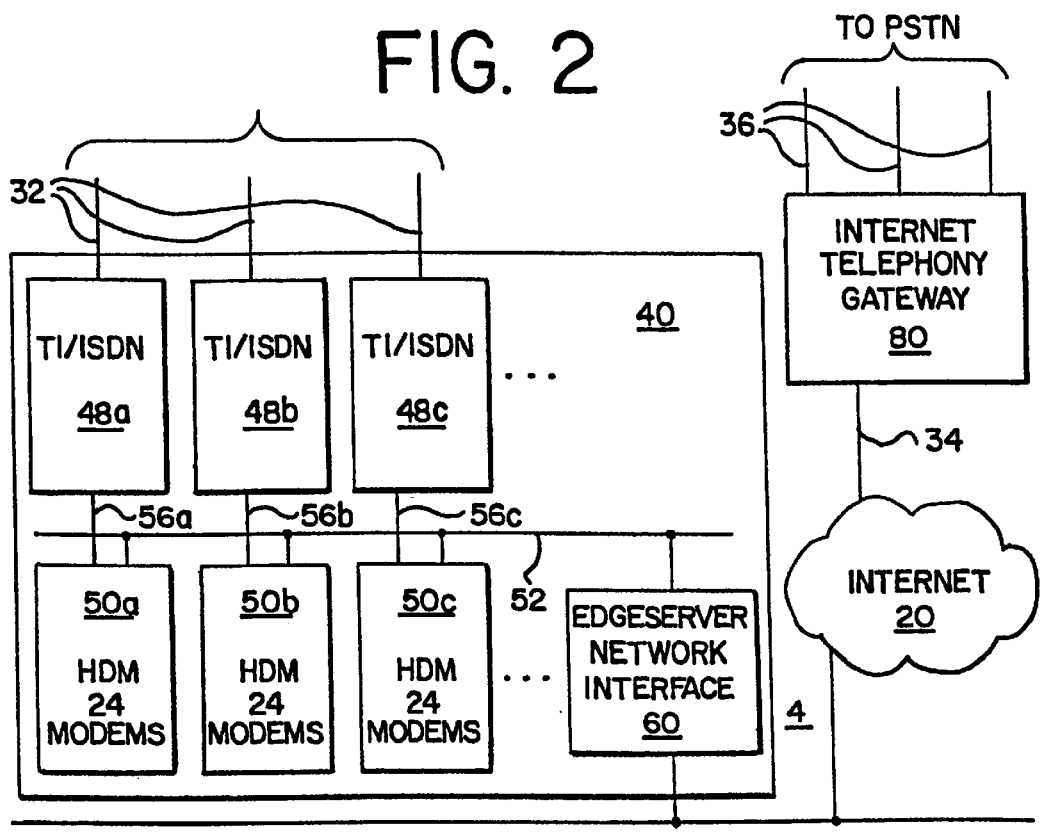
FIG. 2 is a schematic diagram of the Internet telephony gateway used in the network-based telephone system in FIG. 1.

The architecture of a gateway configured as the gateway 40 in a preferred embodiment is shown in FIG. 2. The gateway 40 in FIG. 2 includes a plurality of high-density modems 50a–c each having a T1/ISDN telephone line interface 48a–c. The high-density modems 50 communicate with a network interface 60 over a packet system bus (S-bus) 52. The high-density modems 50a–c, the T1/ISDN telephone line interfaces 48a–c and the network interface 60 are preferably on individual printed circuit boards or cards arranged in a chassis. The high-density modems 50 are "high density" in that each high-density modem 50 contains a high-density digital signal processing (DSP) configuration capable of handling 23, 24 or 30 DS0 channels.

By providing a set of high density modem cards 48 and a robust computing platform in the network interface 60, a single chassis can process many hundreds of calls through the device simultaneously. The term "high-density modem" for the modem cards 50*a*–*c* in FIG. 2 is an acronym for "high density modem," indicating that each card performs modem functions for a large number of channels on the telephone line. For example, each high-density modem 50 may perform modem functions for 23 B channels plus 1 D channel for an ISDN Primary Rate Interface, 24 DS0 channels for a T1 line and 30 channels for an E1 line.

In the embodiment of FIG. 2, each high-density modem card 50*a*–*c* has its own T1/ISDN telephone line interface 48*a*–*c* connected to an ISDN PRI or T1 line at connection 32. The T1/ISDN telephone line interface 48 is connected to the high-density modem cards by a TDM bus 56*a*–*c*, as described in detail in the Walsh et al. '595 patent. The T1/ISDN telephone line interface 48 of FIG. 2 is described in detail in the Walsh et al. '595 patent, therefore the reader is directed to the patent for a detailed discussion of its construction and functionality. The T1/ISDN telephone line interface 48 card is composed of two separate modules (not shown), an incoming call interface module and an incoming call application module. The interface module physically receives the incoming T1 span lines at connection 32, converts the signal in a digital TTL format, and delivers the signal to the incoming call application module. The interface module provides a channel switching unit (CSU) interface which recovers clock signals and data from the incoming T1 signals, and also provides the transmission of outgoing digital telephone signals representing digital data to the T1 line at connection 32. The application module provides framing of recovered T1 data to extract the T1 DS0 channel data and then switches the channel data twenty four time slots on a TDM bus 56 to the corresponding high-density modem 50.

An alternative for connecting the T1/ISDN telephone line interface cards 48*a*–*c* to the high-density modems 50*a*–*c* would be to provide a plurality of T1/ISDN telephone line interface cards 48 and distribute channel data to the modems via a TDM bus with extra highway lines, as described in Schoo et al The high-density modem cards 50 are connected to the network interface card 60 via a high-speed parallel packet bus 52, similar to that described in the Walsh et al. patent. The number of high-density modem cards 50 and associated telephone line interface cards 48 is essentially arbitrary, but 10 to 24 such cards are typical in a high density gateway application today, providing modem functionality for between 240 and 576 T1 DS0 channels.

The network interface or EdgeServer™ card 60 consists of a general purpose computing platform (such as an IBM PC) running a stand alone or shareware network operating system such as Windows NT™ from Microsoft Corporation or UNIX. The network interface card 60 contains software and hardware modules to perform call routing, modem configuration and other features as set forth and described for the gateway modules in the Walsh et al. '595 patent and the Baum et al. U.S. Pat. No. 5,577,105, also incorporated by reference herein. Further details on the design and features of the EdgeServer™ card 382 are set forth in the patent application of William Verthein et al. Serial No. 08/813,173, the contents of which are incorporated by reference herein.

The gateway 40 shown in FIG. 2 is useful for a number of different types of applications, such as Internet access, remote access to corporate backbone networks, video and audio conferencing, Internet telephony, digital wireless Internet and corporate network access, to name a few. In an Internet telephony embodiment, the product provides a facility for users to engage in long distance telephone, audio/visual and/or data sessions using the Internet as the transport medium rather than the long distance public switched telephone network of the inter exchange carriers. Users realize substantial savings in transmission charges as compared to phone charges.

C. Audio Processing and DTMF Carriage

1. Audio and DTMF Streams

Once the telephone connection 30 is made, an audio signal carrying the user's voice is communicated in full duplex between the two telecommunications devices 10, 12. The audio signal may include DTMF signals if either the called or the calling telecommunications device 10, 12, 14 include applications that require signaling. DTMF signals are available on all telephones or are easily generated by other devices, and are, therefore, convenient providers of such signaling. Applications that may use such signaling include banking by phone, voicemail, PBX systems, message machines with DTMF control, appliances with a telephone interface for control by DTMF signals, keyed telephone systems and phone ordering systems. When a user calls to telecommunications devices using such applications, the telephone connection 30 should carry DTMF signaling.

Figure 3:
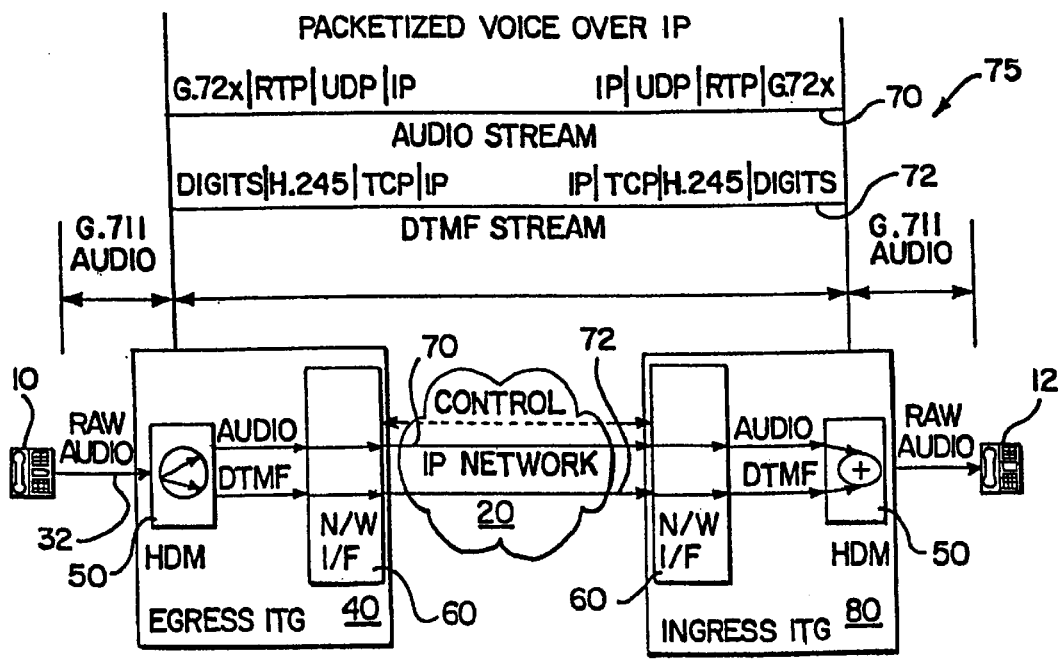
FIG. 3 is a block diagram of the system in FIG. 1 illustrating the communication of the audio signals and of the DTMF signals over the network-based telephony system of FIG. 1.

FIG. 3 illustrates how DTMF signals may be carried from the first telecommunications device 10 to the second telecommunications device 12. The calling telecommunications device 10 generates an audio signal on connection 32. The audio signal preferably includes G.711 PCM-coded voice signals. DTMF signals, also G.711 PCM-coded, may be included in the audio signal as the user presses dialing keys, or otherwise generates DTMF tones on the connection 32. The high-density modem 50 in the local gateway 40 receives the audio signal from connection 32. In a preferred embodiment, the G.711 audio signal is transcoded to a G.723.1/G.729 compressed audio signal. Because DTMF signals may become distorted during the transcoding to G.723.1/G.729 signals, the DTMF signals are removed from the original audio signal to split the signal into separate DTMF signals and the audio signal without the DTMF signals.

Each signal is formatted into a separate stream, an audio stream 70 and a DTMF stream 72, for transport over the PBN 20. FIG. 3 illustrates the protocols 75 used to create the streams. The audio signal is preferably converted to the G.72x (G.723.1 or G.729) compressed audio standard format. The compressed audio is formatted as packets of data according to the Real-time Transport Protocol (RTP) standard. The RTP packets are then transported according to the UDP/IP network and transport protocols. The stream 70 is processed using the same protocols in reverse at the remote gateway 80.

The DTMF signals may be converted to the DTMF stream 72 for transport over the PBN 20 using a variety of methods. In a preferred embodiment, each DTMF signal is translated to a DTMF digit that may match the dialing keypad number pressed to generate the signal. The DTMF digit is communicated as an H.245 control, using for example, the UserInputIndication message. Using the TCP-based H.245 standard to transport the DTMF stream 72 ensures reliable delivery of the DTMF stream. Alternatively, the DTMF stream may be transported as UDP-based RTP packets.

The remote gateway 80 receives the audio stream 70 and the DTMF stream 72 and extracts the audio and DTMF signals according to the protocol used to create the streams. The remote gateway 80 re-aligns the audio and DTMF streams 70 and 72 because the streams may become skewed for reasons other than the processing time for detecting DTMF signals in the calling gateway. For example, the audio and DTMF streams 70 and 72 may be transported using different protocols; one using a reliable connection (e.g. TCP) and the other being unreliable (e.g. UDP). Packets on the reliable connection are more likely to be delayed in relation to the packets on the unreliable connection. The audio and DTMF signals are then multiplexed and encoded to first, a G.723.1 or G.729 signal, and then to a G.711 signal. The G.711 audio signal is communicated to the destination party at the telecommunications device 12.

In the local gateway 40, the process of converting the audio signal into the audio stream 70 and the DTMF stream 72 creates a skew between the DTMF digits and the corresponding audio packets in the audio stream. The skew is caused by an additional 30–60 ms. in processing time required to detect and decode the DTMF digits over the time required to encode the audio signal.

The effect of the skew is diminished by delaying the audio signal by approximately 30–60 ms. However, phone-to-phone connectivity requires a round-trip delay not to exceed 300 ms., exclusive of the gateway delay. The most significant element along the data path contributing to the round-trip delay is the gateway. The round trip delay includes two traverses of gateways in each direction along the data path. If the audio signal is delayed and the DTMF signals removed from the audio signal, the round-trip delay to just allow the detection and removal of the DTMF from the audio stream may be over 100 ms. or, over a third of the permitted 300 ms. delay.

A delay generator is included in the local gateway 40 and in the remote gateway 80 to generate a delay in the audio signal only when DTMF signals are present in the input audio signal at connection 32.

2. Software Architecture of the Gateway

Figure 4:
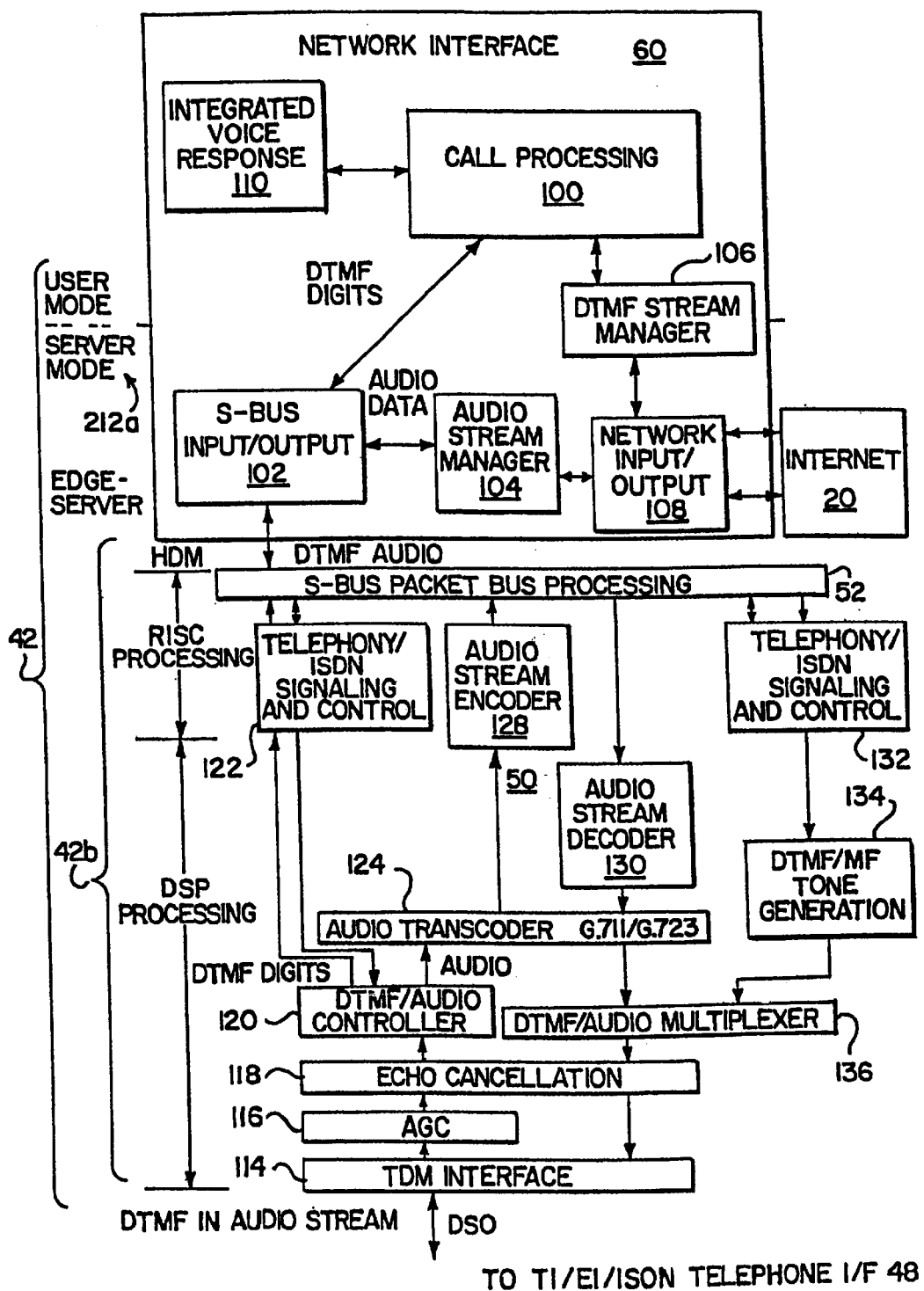
FIG. 4 is a high level diagram of the software architecture of the Internet telephony gateway of FIG. 2.

FIG. 4 is a high level diagram of the software architecture of the Internet telephony gateway 40 of FIG. 2. The diagram includes the architecture of the network interface 60 and of one of the high-density modems 50. The software architecture of the gateway 40 is preferably designed to use distributed processing of the RTP protocol as described in Schoo et al. The various processing levels available in the gateway 40 are shown at 42. The processing levels in the network interface at 42*a* are the kernel mode and the user mode. The processing levels in the high-density modem at 42*b* are at the RISC processing and the DSP processing levels. One of ordinary skill in the art will understand that the functions described in FIG. 4 may be performed at any level according to the description in Schoo et al. and according to specific requirements imposed by design choices.

The network interface 60 includes a call process driver 100, an S-Bus I/O controller 102, an audio stream manager 104, a DTMF stream manager 106 and a network I/O controller 108. Optionally, an interactive voice response driver 110 may be included.

The call process driver 100 manages the setting up, monitoring and tearing down of the telephone connection 30 (shown in FIG. 1). In a switch independent gateway, the call process driver 100 includes resources for communicating with the integrated voice response 110 to query the caller for the call setup information. The call process driver 100 may query the caller for the destination telephone number and an access code or password. The integrated voice response 110 may include a voice prompt manager for playing voice messages back to the caller (e.g. a welcome message and prompts for a telephone number). In a switch-dependent gateway, the call process driver 100 includes resources for formatting the DTMF digits received from the high-density modem as the destination telephone number and as any other call setup information. The call process driver 100 includes resources for determining the called gateway 80 closest to the local exchange 17 of the destination telephone number.

The call process driver 100 may also include functions for accessing resources for billing and for maintaining or accessing information about either the calling or the called party. The information about either the calling or called party that is maintained or accessed by the call process driver 100 may be used to determine whether DTMF signals are used. This information may also be used to determine whether an audio delay is required, and if so, for how long the delay is needed. For example, the call process driver 100 may be able to maintain a database that includes data elements indicating that the destination phone number is for a voicemail system, a PBX with special services or some other supplementary service that might use DTMF signals. The call process driver 100 may also determine if the destination telephone number uses DTMF signals by analyzing the pattern of digits dialed (e.g., a "#" [pound] access code may indicate a service that relies on the use of DTMF signals). The call process driver 100 may also recognize the called party's number, or access number as a party that uses DTMF signals.

One of ordinary skill in the art will appreciate that the recognition of the called party's number as a party that is often sent DTMF may be performed either in the call process driver 100 or in another device (such as the gatekeeper 22) that forwards this information to the call process driver 100.

The call process driver 100 may also maintain whether the use of DTMF signaling comes at the beginning of a call and for how long the DTMF signaling is typically used. For example, the call process driver 100 may maintain data records for destination telephone numbers to voicemail that indicate that DTMF signals are typically used during an initial period of the telephone connection.

Once the telephone connection 30 is established, the call process driver 100 maintains the call resources. These resources may include, for example:

Caller telephone number
Calling telephone number
Calling gateway IP address
Logical channel for audio
Logical channel for control and signaling
Destination Type
Destination DTMF use at beginning
Caller Type
Caller DTMF use at beginning
The above information may be kept in a database, or may be received from the called or calling party using the H.245 capabilities exchange or using an H.245 UserInputCapability control message.

The call process driver 100 receives messages from remote gateways via a DTMF stream manager 106. The DTMF stream received from the PBN 20 is translated through a network interface software structure (WinSock, BSD sockets or TDI), the details of which are not important and readily derived by persons of skill in the art.

In a preferred embodiment, the DTMF stream manager 106 receives H.245 UserInputIndication (UII) control messages from the network I/O 108 and sends DTMF digits to the call process driver 100. The H.245 messages may also include information that may be carried using non-standard extensions (according to H.245v2) or standard extension (according to H.245v3) to the UII control. The information that may be carried includes:

Time stamp: In terms of the real-time transport protocol (RTP) time stamp on the associated audio channel, the time at which the tone should be generated and injected into the telephone network audio stream.

Expiration time: In terms of the RTP time stamp on the associated audio channel, the after which the tone shall be considered "stale" and discarded by the called party without further processing.

Logical channel number: the logical channel number of the associated audio channel.

Indication of tone duration.

Alternatively, control information may be transmitted to the call process driver 100 according to different protocols. For example, the RTP protocol may be used to communicate DTMF digits in an RTP DTMF session separate from the RTP audio session.

When the gateway is the local gateway in a telephone connection, the DTMF stream manager 106 receives DTMF digits from the call process driver 100 for transport to the PBN 20.

The DTMF stream manager 106 sends or receives DTMF digits to or from the network I/O 108. The network I/O 108 sends and receives audio and DTMF streams to and from the PBN 20. When receiving data from the network, the network I/O 108 determines whether it is an audio stream transported over the UDP/IP protocols, or a DTMF stream transported over the TCP/IP protocols. When sending data to the network, the network I/O 108 uses the appropriate protocol according to the data received. DTMF data in H.245 format is sent using the TCP/IP protocols and audio data in RTP packets is sent using the UDP/IP protocols. Preferably, the network I/O 108 uses a Network Driver Interface Specification (NDIS) for determining the protocols used by the data received from or to be sent to the PBN 20.

The audio stream manager 104 receives audio packets from either the network I/O 108 or the S-Bus I/O 102. The audio packets received from the network I/O 108 are stripped of UDP/IP headers and sent to the S-Bus I/O 102 for delivery to the high-density modem 50. The audio packets received from the S-Bus 102 are provided with a header and delivered to the network I/O 108.

The S-Bus I/O 102 receives and transmits packets of DTMF and audio data on the S-Bus (TDM) 52. The S-Bus I/O 102 directs DTMF digits to the call process driver 100 and audio RTP packets to the audio stream manager 104.

The high-density modem 50 sends and receives data to and from the network interface over the S-Bus 52. Although only one high-density modem 50 is illustrated in FIG. 4, the gateway 40 may include any number of high-density modems 50. Each high-density modem 50 shares the S-Bus 52 to communicate with the network interface 60.

The high-density modem 50 includes a TDM interface 114 for receiving audio data from the telephone/ISDN interface 48. The audio data is received in the form of raw G.711 data. At the DSP processing level, the audio data is processed by an automatic gain control module (AGC) 116, a line echo cancellation module 118, a DTMF/audio controller 120 and an audio transcoder 124. The AGC module 116 is known in the art and requires no further description.

The high-density modem 50 uses the line echo cancellation module 118 The echo cancellation uses signal correlation techniques to determine parameters of a filter that processes the incoming signal on the 4-wire side of a hybrid. The filter forms an estimate of the echo when an incoming signal is present. This estimate is subtracted from the signal on the return path.

The DTMF/audio controller 120 processes the audio signal received from the telephone/ISDN interface 48. The DTMF/audio controller 120 analyzes the G.711 audio data for data bytes and strings of data bytes that correspond to a digitized tone having a frequency matching the combination of the low and high frequencies of the DTMF tones. Once the DTMF tone is detected, the digit matching the tone is output for use in signaling and control functions. The DTMF/audio controller 120 removes the DTMF tone data from the audio data to produce a voice-only audio signal. The audio signal is output to the audio transcoder 124.

The DTMF/audio controller 120 also generates a delay in the audio signal when DTMF signals are detected or when the telephone connection will likely carry DTMF signals. Otherwise, the audio signal is output without a delay. The DTMF signals may be detected using a DTMF detector which triggers the delay and the removal of the DTMF digits. The gateway 40 may determine, based on characteristics of the calling parties or of the source or destination telephone numbers, that the telephone connection will likely carry DTMF signals. In one embodiment, the DTMF/audio controller 120 may obtain information regarding the characteristics of the telephone connection from the call process driver 100. The audio transcoding between G.723.1 and G.711 may be used for the high-density modem when the G.711 audio stream arrives from the PSTN/ISDN clients over T1 and the G.723.1 compressed stream arrives from the LAN side. Specifically, the following functions may be supported by the audio transcoder 124:

Each DSP engine supports 2 concurrent full-duplex G.723.1/G.711 transcoder tasks.

The transcoder implementation is compliant to the G.723.1 and G.711 ITU implementation.

It supports encoder/decoder independence such that one can allocate any combination of encoders or decoders according to system configuration and within the DSP resource limits.

It supports synchronous output to the T1 interface.

The audio transcoder 124 may be eliminated if G.711 is received from the telephone network and is packetized as RTP/G.711 for transporting over the Internet.

At the RISC processing level in the high-density modem, the audio signal is received from the audio transcoder 124 and organized in RTP packets in the audio encoder 128.

Also at the RISC processing level, the DTMF digits may be organized for transmission to the network interface 60 at a telephony/ISDN signal and control transmitter 122. The DTMF digits may be sent to the network interface 60 using a data structure that contains a time stamp, a tone duration and other selected information. The telephony/ISDN signal and control transmitter 122 may also be used to request information from the network interface 60. In a preferred embodiment, protocol processing is distributed between the network interface 60 and the high-density modem 50. The telephony/ISDN signal and control transmitter 122 may be used to request information associated with the telephone connection, such as information about the audio session, the DTMF session, the calling party, the called party, or the destination gateway.

The high-density modem 50 processes data received from the network interface 60 for transmission to the telephone network at the RISC processing level using a telephony/ISDN signaling and control receiver for receiving DTMF digits from the network interface 60 over the S-bus 52. The telephony/ISDN signaling and control receiver 132 receives the DTMF digits and other information and outputs it to the DTMF tone generator 134. The telephony/ISDN signaling and control receiver 132 may also receive information requested by any component of the high-density modem 50 via the telephony/ISDN signaling and control transmitter 122. For example, the audio encoder 128 may request information about the called party by issuing a request via the telephony/ISDN signaling and control transmitter 122 and receive the response via the telephony/ISDN signaling and control receiver 132. Such information may include whether the called party has the capability or typically uses DTMF signaling.

At the DSP processing level, the high-density modem 50 uses a jitter and audio encoder module 130, a DTMF/MF tone generator 134, a DTMF/audio multiplexer 136, the audio transcoding module 124, the echo cancellation module 118 and the TDM interface 114 to transmit data to the telephone network. The jitter and audio decoder module 130 receives RTP packets and converts the packets to a stream of G.723.1 or G.729 audio data. The audio transcoder 124 converts the G.723.1 or G.729 data to G.711 data.

The DTMF tone generator 134 converts the DTMF digits into the G.711 data that translates to the tone indicated by the DTMF digits. If tone duration information is included with the DTMF digits, the DTMF tone generator 134 uses the information to adjust the tone duration. The DTMF tone data is output to the DTMF/audio multiplexer 136 where the DTMF tone data is injected into the audio stream. If a time stamp is included, the DTMF tone generator 134 and the DTMF/audio multiplexer 136 wait to inject the G.711 tone data into the audio data until the time indicated in the time stamp. In a preferred embodiment, DTMF/audio multiplexer 136 aligns the DTMF data with the audio data when the audio data and the DTMF data is received from the audio and DTMF streams that have been received at the high-density modem 50 from the network interface 60.

Once the audio signal includes the DTMF tone data, the audio signal is processed for echo cancellation at the echo cancellation module 118 and sent to the telephone network via the TDM interface 144 to the T1/ISDN telephone interface 48.

3. Audio Delay Generator and DTMF Processing

Figure 5:
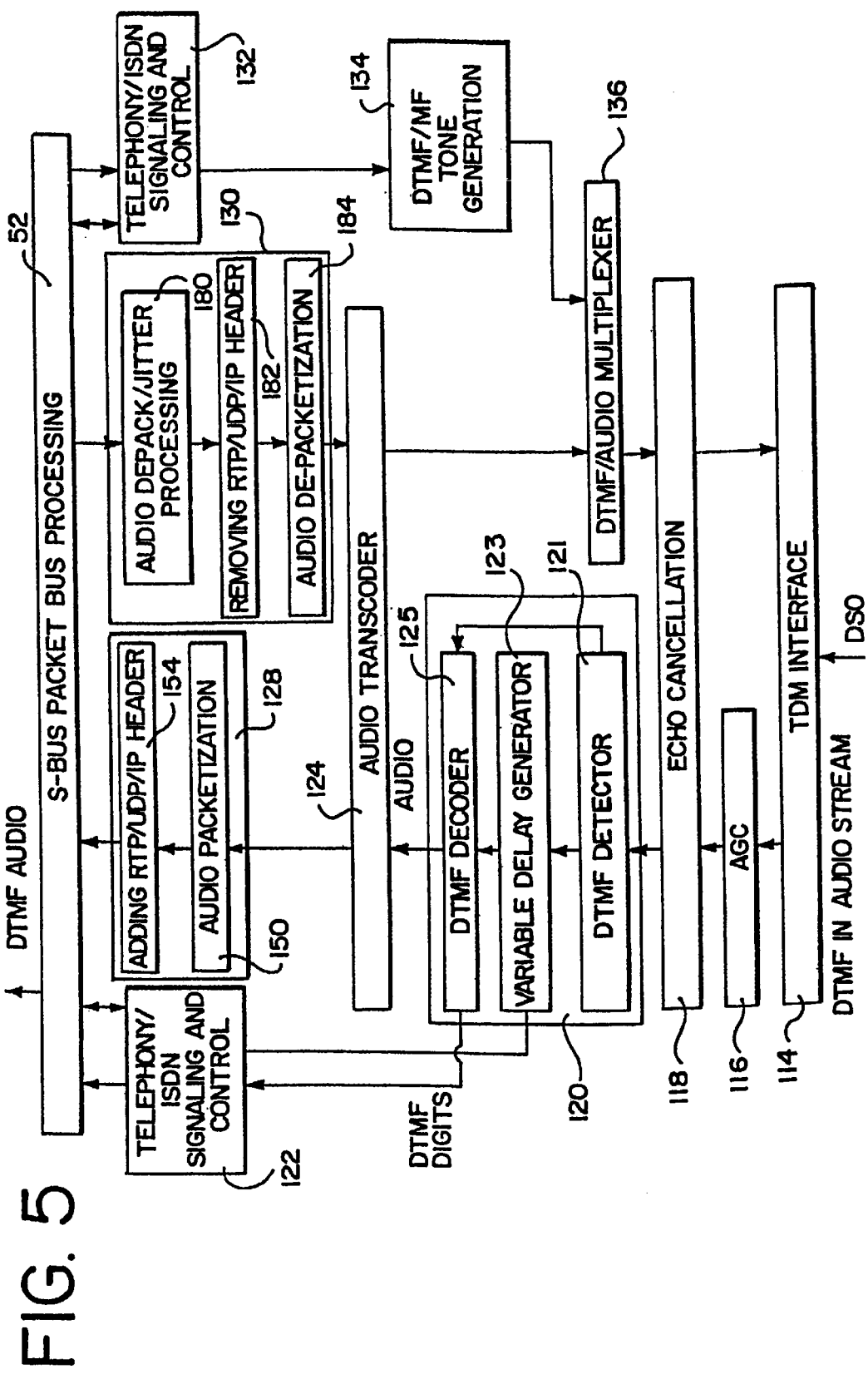
FIG. 5 is a more detailed diagram of the software architecture in FIG. 4 showing the processing of the audio and DTMF signals in the high density modem according to a preferred embodiment of the present invention.

FIG. 5 is a diagram of the software architecture of the high-density modem 50 of FIG. 4 incorporating a preferred embodiment for reducing the effect of the skew between the DTMF and audio signals. The DTMF/audio controller 120 of FIG. 5 includes a means for generating a delay in the audio stream to align the audio stream with the DTMF stream. However, the DTMF/audio controller 120 generates the delay only when a DTMF signal is detected in the audio signal. If no DTMF signals are detected in the audio signal, the call proceeds with no delay in the audio stream. The audio delay may be imposed for the duration of the call after sensing the first DTMF signal, for a fixed time after sensing the first DTMF signal or until a fixed time after sensing the last DTMF signal.

The audio encoder 128 in FIG. 5 includes an audio packetization module 150, and an RTP/UDP/IP header processing module 154. The audio decoder 130 includes a jitter and packet re-ordering processing module 180, an RTP/UDP/IP header removing module 182, and an audio de-packetization module 184.

The audio packetization module 150 receives strings or arrays or a stream of bytes representing the audio signal after it has been encoded to, preferably, the G.723.1 format. The audio packetization module 150 frames RTP-based packets containing the audio signal for transport over the Internet network. The function performed by the audio packetization module 150 conforms to the ITU H.225.0 Annex F—new audio packetization for G.723.1. Both 6.3 kbps and 53 kbps rates are a part of the G.723.1 encoder and decoder. A G.723.1 frame can be one of three sizes: 24 bytes, 20 bytes, or 4 bytes. These 4-byte frames are called SID (silence insertion descriptor) and are used to specify comfort noise parameters. There is no restriction on how 4, 20, and 24 bytes are intermixed. The first two bits in the frame determine the frame boundary. It is possible to switch between the two rates at any 30 ms frame boundary. This packetization scheme is compliant to RFC 1890 for the packetization interval with the following specification:

The first packet of a talk-spurt (first packet after a silence period-a talk-spurt is the group of data that represents voice signals after a period of silence) is distinguished by setting the market bit in the RTP data header.

The sampling frequency (RTP clock frequency) is 8000 Hz.

The packetization interval should have a duration of 30 ms (one frame) as opposed to the default packetization of 20 ms Codecs should be able to encode and decode several consecutive frames within a single packet.

A receiver should accept packets representing between 0 and 180 ms of audio data as opposed to the default of 0 and 200 ms.

The audio packetization module 150 may insert silence packets for periods between talk-spurts. Alternatively, the silence may be suppressed by transmitting only talk-spurts.

The audio de-packetization module 184 in the audio decoder 130 processes the RTP packets that are received from the network for transmission to the telephone network. The packets are processed according to RFC 1890 and the notes above to yield the audio signal in G.723.1 format. The audio de-packetization module 184 receives packets from the jitter and packet re-ordering module 180. The jitter and packet re-ordering module 180 performs jitter buffering in a jitter buffer, with the size of the jitter buffer dynamically changed in order to deal with the bursty, asynchronous nature of packet switched data from the computer network. Packets may be re-ordered in transport and the jitter and packet re-ordering module 180 re-orders the packets to ensure that they are processed in the proper sequence.

The audio packets have an RTP/UDP/IP header attached to them by the RTP/UDP/IP header processing module 154. The RTP/UDP/IP header processing module 154 is responsible for adding the 12 octets of RTP header, 12 octets of UDP header, and 20 octets of IP header to all the audio packets which are transmitted from the telephone network to the LAN. The RTP/UDP/IP header removing module 182 in the audio decoder 130 is responsible for removing the RTP/UDP/IP header from the audio packets for data from LAN to the telephone network.

The DTMF/audio controller 120 includes a DTMF detector 121, a variable delay generator 123, and a DTMF decoder 125. The DTMF detector 121 process the audio signal received from the telephone/ISDN telephone interface 48 to determine if it includes DTMF signals. The DTMF detector 121 analyzes the G.711 data for DTMF tone data. Although the process may take from 30–60 ms., the audio signal need not be delayed. When the DTMF detector 121 detects a DTMF signal, the variable delay generator 123 is triggered to impose a delay. The delay is imposed gradually starting from 0 to approximately 60–100 ms. The variable delay generator 123 may impose the delay using well-known techniques such as elongating talkspurt gap times or adding fill packets to the audio stream.

The DTMF detector 121 may also trigger the DTMF decoder 125 to remove the DTMF signals from the audio signal. The DTMF signals are removed and decoded as DTMF digits which are sent to the telephony/ISDN signaling and control block 122.

The audio delay may be removed when it is no longer needed. Services that use DTMF signaling may use it only for an initial period in the telephone connection. A timer may start timing a selected initial period when the first DTMF signal is detected and signal the delay generator 123 to reduce the delay after the selected initial period in the telephone connection has elapsed. The delay generator 123 gradually reduces the delay until there is no delay in the audio stream.

The timer may also start timing after each DTMF signal is detected. If after a selected time period, no DTMF signals are received, it may be assumed that no further DTMF signaling will be performed during the call. The selected time period may be a constant for all calls, or a time period that may be retrieved from the network interface 60 from the information about the caller and calling parties. The timer may then trigger the delay generator 123 to reduce the delay. The delay generator 123 gradually reduces the delay until there is no delay in the audio stream.

The imposition of the audio delay may also be dependent on whether the calling and called parties are of the type that normally require DTMF signaling. For example, the called party may include a supplementary service in which DTMF signaling may be used to respond to an integrated voice response for access a specific party, or for access to a voice mail service, or for responding to requests for billing information (e.g. credit card number). Once the desired called party is reached, the communication is conducted by voice and DTMF signaling is no longer needed.

The DTMF detector 121 may obtain information regarding the caller or calling party from the network interface 60 via the telephony/ISDN signaling and control transmitter 122 and receiver 132. The timer may be used to signal an initial time period during which the audio delay is imposed. The initial time period may be a constant for a class of caller and calling party types, or specific values may exist for individual caller or calling parties. When the time period lapses, the timer signals the variable delay generator 123 to reduce the delay until it disappears.

The variable delay generator 123 may determine that the called or calling party uses DTMF signaling from the pattern of the DTMF digits received. For example, a service provider may provide a service that is always accessed by dialing a specific sequence of digits. The variable delay generator 123 may impose the delay in the audio stream when the string of digits is dialed. Similarly, a calling party may be of a type that uses DTMF signaling. The delay generator 123 may impose the delay in the audio stream when the string of digits that identify the calling party is entered during the process of obtaining access to the Internet telephony system.

D. Methods for Controlling Audio Delay for DTMF Carriage

Figure 6:
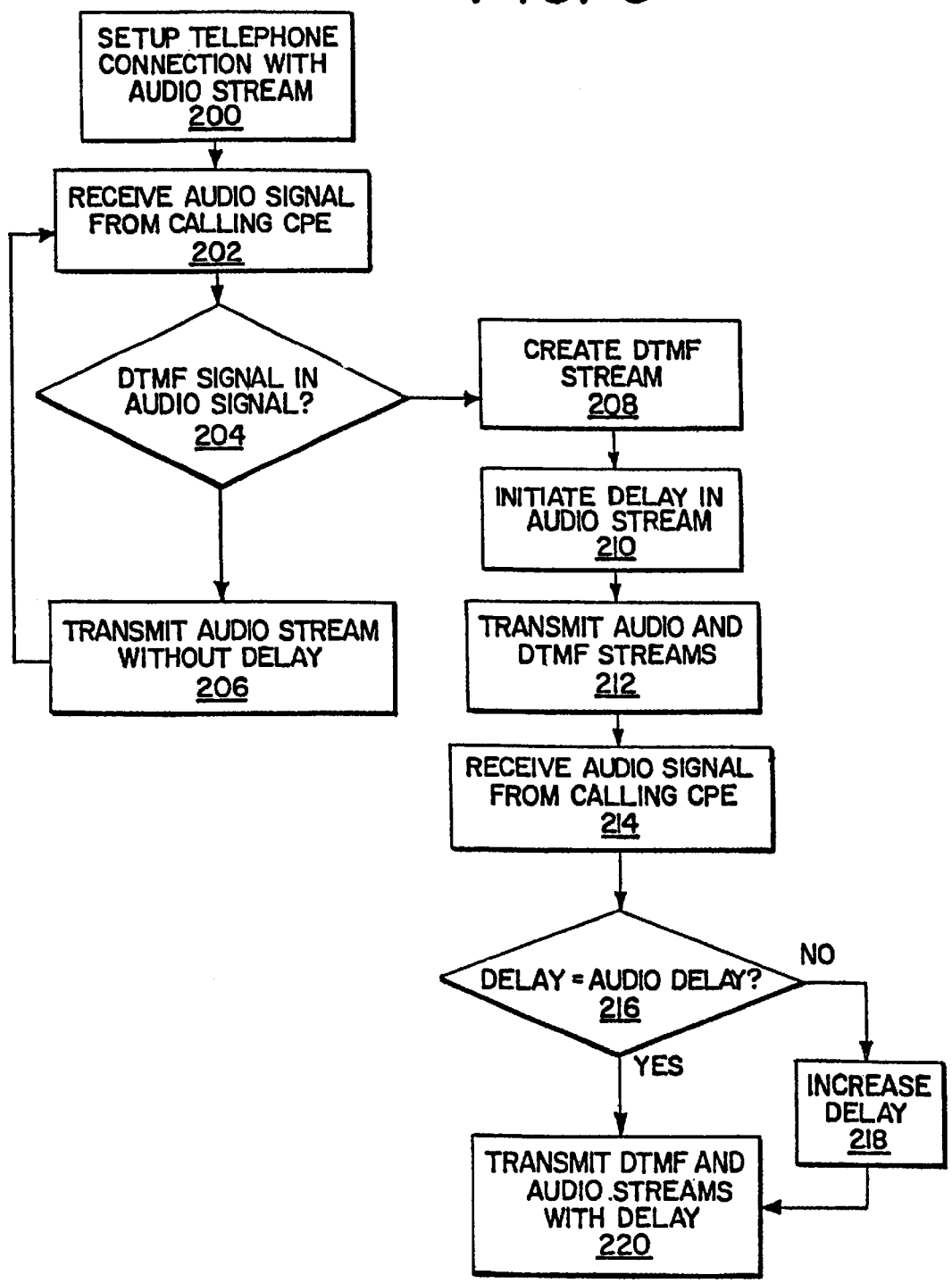
FIG. 6 is a flowchart of one method for processing DTMF signals according to a first embodiment of the present invention.
Figure 7:
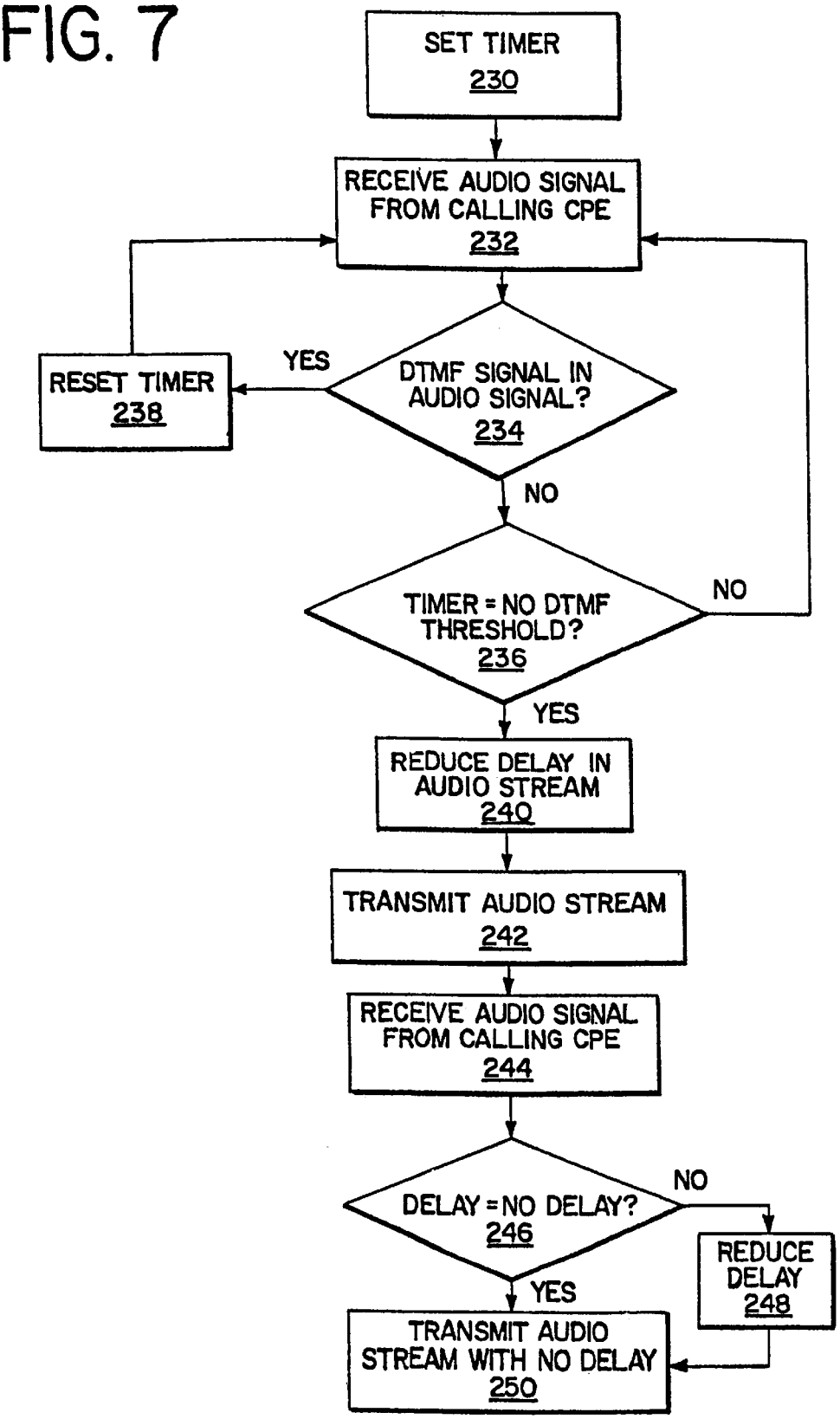
FIG. 7 is a flowchart of a method for removing an audio delay from an audio stream according to a preferred embodiment.
Figure 8:
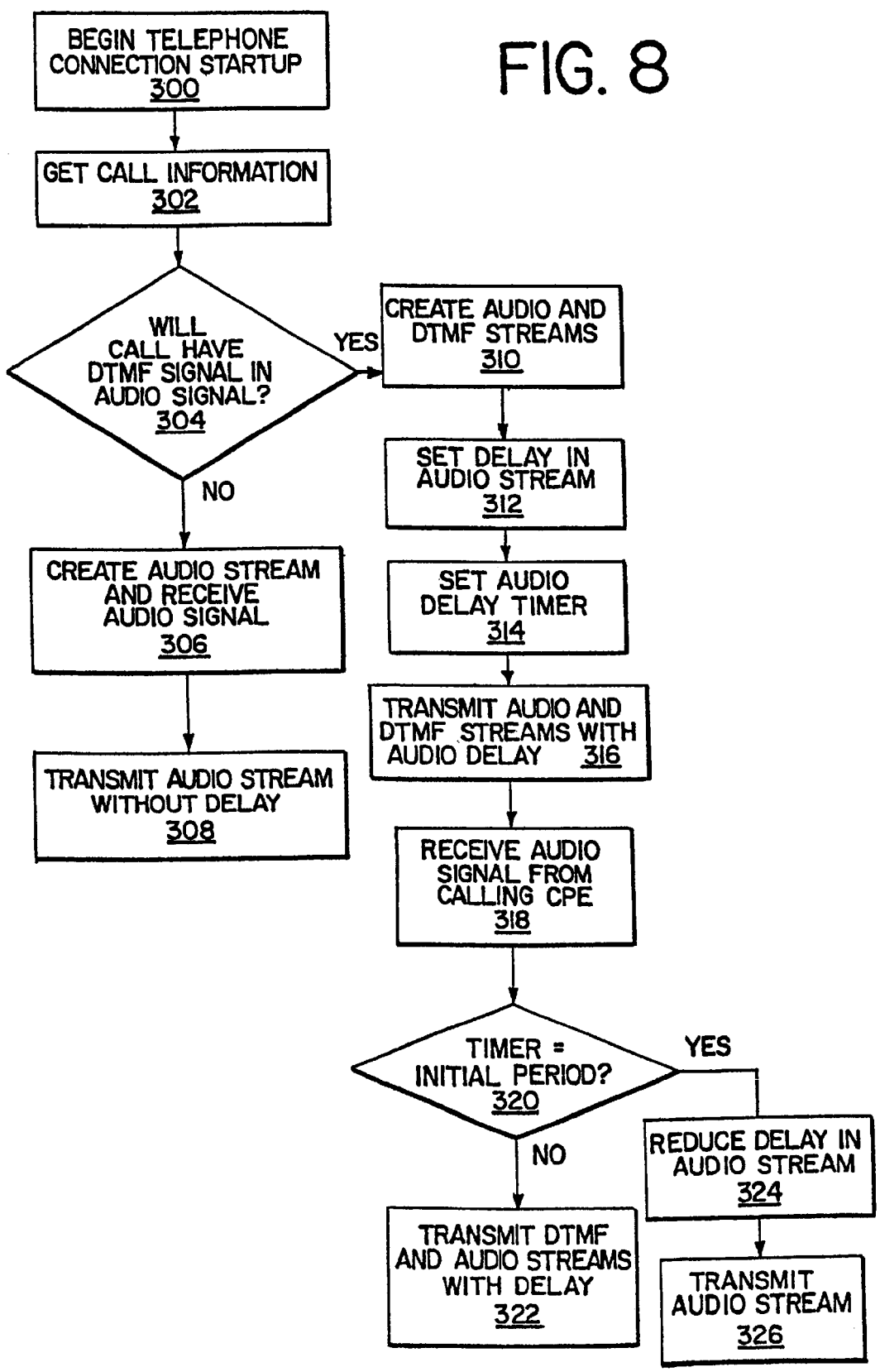
FIG. 8 is a flowchart of an alternative method for processing DTMF signals according to an alternative embodiment of the present invention.

FIGS. 6, 7 and 8 are flowcharts for preferred embodiments for transmitting audio signals with DTMF signals. FIGS. 6 and 7 illustrate methods for imposing and removing delays in the audio stream in the presence or absence, respectively, of DTMF signals. FIG. 8 is a flowchart for a method of imposing and removing the delay in the audio stream according to the nature of the call. The description of the methods in FIGS. 6, 7 and 8 refers to preferred embodiments of the system described in FIGS. 1–5. It is to be understood by one of ordinary skill in the art, however, that the methods in FIGS. 6, 7 and 8 are not limited to any particular system. Any system having resources that are the same or equivalent to those described below may perform the methods in FIGS. 6, 7 and 8.

FIG. 6 is a flowchart of a method for transmitting audio signals with DTMF signals according to a preferred embodiment of the present invention. The method in FIG. 6 imposes a delay in the audio stream to align the audio and DTMF streams. The method advantageously imposes the delay only when DTMF signals are detected.

The method in FIG. 6 is preferably performed in the local gateway 40 in FIG. 1. The local gateway 40 receives a request to make a telephone call from the calling party at the calling CPE 10. The local gateway 40 may be a switch-dependent or a switch independent gateway.

The method in FIG. 6 begins with a call setup procedure as shown at step 200. The call setup procedure performs the steps necessary to establish a telephone connection. Such steps may include the steps of receiving access information from the calling party at the calling CPE 10, receiving destination party information and establishing the audio stream.

In a switch dependent gateway, the caller at the calling CPE 10 dials a number that connects the CPE 10 to the local gateway 40 via the local exchange in the telephone network 16. The local exchange in the telephone network 16 is provisioned to connect to the local gateway 40 and to communicate the destination party information. In a switch independent gateway, the caller dials a number to connect to the local gateway 40. The local gateway 40 performs the queries for information from the user and performs the steps of connecting to the called gateway without assistance from the local exchange.

The local gateway 40 uses the destination party telephone number to connect to the remote gateway 80. The remote gateway 80 dials the destination telephone number via the called local exchange 17 in the telephone network. Once the called party at the called CPE 12 opens the connection, the local gateway 40 creates an audio stream which may include any signal transformation steps and any data encapsulation necessary for transporting data over the PBN 20.

Once the audio stream is established, the local gateway 40 receives audio signals from the calling party at the calling CPE 10 at step 202. The calling gateway 40 analyzes the audio signal to determine if it contains DTMF signals at decision block 204. As long as no DTMF signals are detected, the calling gateway 40 transmits the audio signal over the audio stream without delay at step 206.

If a DTMF signal is detected, a DTMF stream is created at step 208. If not enough delay is in the local gateway 40 to detect a DTMF signal before the audio is sent, then the local gateway 40 will not send a separate DTMF digit in parallel with the DTMF signal in the packetized audio stream. This is because there may be two DTMF digits received at the destination device if enough skew occurs between the audio and the DTMF streams. It is therefore possible that the DTMF signal will not be detected at the destination and, it may also appear to the sending user that a DTMF digit has been lost. To warn the user of this possible event the local gateway 40 may want to play back a warning tone or message to the sending user.

The calling gateway 40 initiates a delay in the audio stream at step 210. The delay preferably begins gradually with a small increase at first. At step 212, the DTMF stream and audio stream may be transmitted with a decreasing skew. At step 214, the calling gateway 40 continues to receive audio signals from the calling CPE. The delay is checked at decision block 216 to determine if it has reached the Audio Delay, which is the delay needed to detect the presence of DTMF in the audio signal. As described above, this delay is needed to allow the DTMF to be detected and removed from the incoming PSTN audio signal of the local gateway 40 before it is transcoded and/or packetized for sending over the PBN.

If the delay has not reached the Audio Delay, the delay is increased at step 218. Once the delay in the audio stream reaches the Audio Delay, then the normal three step process of: Detection of the DTMF in the audio stream; removal of the DTMF from the audio stream; and finally the generation of a separate DTMF stream can be performed at steps 220. Before this time the DTMF will just be allowed to be sent over the Internet in the audio stream.

The DTMF stream and the audio streams may be transported with the delay in the audio stream for the remainder of the call. The advantage of the method of FIG. 6 is that only calls that have DTMF signals have a delay in the audio stream. The method of FIG. 6 is a significant advantage over having a permanent delay in the audio stream. However, the method of FIG. 6 may be further improved by removing the delay in the audio stream in the absence of DTMF signals after a selected period of time.

FIG. 7 is a flowchart for a method of eliminating the delay in the audio stream when DTMF signals are not sensed for a selected period of time. At step 230, once the calling gateway 40 is transmitting the audio stream with a delay, a timer is set 230 to count down for (or up to) a time period after which further reception of DTMF signals is unlikely. The time period is designated NO DTMF THRESHOLD and may be determined empirically for the types of calls that may be expected at any selected gateway. If the calls expected for a given gateway typically use DTMF signals in integrated voice response applications, a NO DTMF THRESHOLD of 30 to 60 seconds may be appropriate.

The calling gateway 40 continues to receive the audio signal from the calling CPE at step 232. As the audio signal is received, the calling gateway analyzes the signal for DTMF signals at decision block 234. If no DTMF signals are received, the timer is checked to determine if the NO DTMF THRESHOLD has been reached at decision block 236. If DTMF signals are received, the timer is reset at step 238 and the calling gateway continues to receive audio signals. If no DTMF signals have been received, but the timer has not yet reached the NO DTMF THRESHOLD, the calling gateway continues to receive audio signals.

If the timer has reached the NO DTMF THRESHOLD at decision block 236, the calling gateway 40 begins to reduce the audio delay at step 240. The process of reducing the delay may include the steps of reducing the time between talk-spurts, or by eliminating fill packets that had been inserted in the audio stream to impose the delay. The time between the talk-spurts may be reduced by shrinking a delay buffer that may be used for imposing the delay in the audio. The delay may also be reduced by gradually dropping valid audio packets. The valid audio packets are dropped gradually enough to avoid perceptible distortion. The calling gateway 40 continues to transmit the audio stream with a diminishing delay at steps 242 and step 244.

At decision block 246, the delay is checked to determine if it has been eliminated. If the delay has reached no delay, the audio stream is transmitted without any audio delay at step 250. If any audio delay remains in the audio stream, the delay is further reduced at step 248.

The advantage of the methods in FIGS. 6 and 7 is that the audio delay is imposed in the audio stream when the first DTMF signal is sensed. If no DTMF signal is sensed in a telephone call, then no audio delay is used. One problem, however is that the first several DTMF signals sensed may be transmitted just in the audio stream, and may therefore not be accurately received at the destination. FIG. 8 is an alternative method for imposing a delay in the audio stream when the call information indicates that DTMF signals may be used during the course of the telephone call.

At step 300 in FIG. 8, the calling gateway begins the setup of the telephone connection. In the process of establishing the audio stream between the calling and called gateways, the high-density modem requests call information from the call process driver in the network interface at step 302. It will be readily apparent to one of ordinary skill in the art that there may be various ways to detect that a call is more likely to use DTMF. The called or calling number may be used, or even the DNS could be used. Whether certain numbers use DTMF and the times of the duration of the use of DTMF during the call may be configured or learned by gateways and stored whereever this information is kept. Then for future calls a gateway will be able to better predict which calls and at what points in the calls that DTMF will be sent. The typical services that will use DTMF include voice mail or other messaging services, and shopping services that permit the making of purchases with a credit card over the telephone.

Alternatively, the network interface may request whether either the called party or the calling party operates using DTMF signaling. The request may be made using control signaling between the gateway and the CPE or between the two gateways. The information as to whether DTMF signaling may be used during the call is available to the high-density modem. The high-density modem may also detect during the dialing of the destination telephone number or during the dialing of the access control information whether either the called or calling party, respectively, uses DTMF signaling.

The information regarding the use of DTMF signaling may include whether DTMF signaling is used throughout the call or only for an initial period of the call. The initial period length may also be provided to the high-density modem upon request.

Once the information as to whether or not DTMF signaling will be used during the call is available, the information is analyzed at decision block 304. If DTMF signaling is not going to be used, the audio stream is created at step 306 and transmitted without delay at steps 308.

If at decision block 304 DTMF signaling is going to be used, an audio stream and a DTMF stream is created at step 310. A delay is set in the audio stream at step 312. If the DTMF signaling is only needed for an initial period of the call, an audio delay timer may be set at step 314. The audio delay timer is preferably set to an Initial Period time during which DTMF signaling is used. The calling gateway continues to receive audio signals from the calling CPE at step 318 during the initial period. The timer is checked at step 320 to determine if the Initial Period time has elapsed. If the timer has not reached the Initial Period time, the calling gateway continues to receive audio signal from the calling CPE and to transmit audio and DTMF streams to the called gateway at step 322. If the Initial Period has been reached at decision block 320, the calling gateway starts to reduce the delay in the audio stream at step 324. The audio is transmitted with a progressively reduced audio delay at step 326 until the audio delay is completely eliminated.

One of ordinary skill in the art will understand that the flowcharts in FIGS. 6, 7 and 8 are purely illustrated and are not intended to limit the many ways in which the methods illustrated are implemented. For example, the timer operation may be implemented using an interrupt scheme such that the decision blocks at 236 in FIG. 7 and at 320 at FIG. 8 are carried out as the occurrence of an interrupt indicating that the set time has elapsed. Other examples will be readily apparent to those of ordinary skill in the art.

Furthermore, the method of FIG. 8 may be used in concert with the method described in FIGS. 6 and 7. In such an embodiment, the method of FIG. 8 may be used during the first portion of a call, and the method of FIGS. 6 and 7 may be used after the Initial Period described in step 320 in FIG. 8. One of ordinary skill in the art will appreciate that neither method would be used in the Switch Independent gateway until the call has been established to the destination. In other words, while the gateway is gathering User_ID/PIN and destination phone number via DTMF, no DTMF removal processing should be used.

Presently preferred embodiments have been set forth above. Persons of skill in the art will appreciate that modifications may be made from the disclosed embodiments without departure from the spirit and scope of the invention. For example, preferred methods for transmitting audio signals with DTMF signals have been described as alternatives, the methods may be combined to obtain further advantages. The method in the flow chart in FIGS. 6 and 7 may be used with the method in the flow chart in FIG. 8 for calls in which DTMF signals are used and the calling and called party information may not identify that DTMF signaling will be used. As a further example, while the best mode known to the inventors for practicing the invention has been disclosed in the context of present or proposed commercial products of the applicants' assignee, it will be appreciated that the teachings are readily adaptable to other types of gateways marketed by others in the industry, such as Livingston, Ascend, Cascade Communications, etc. This true spirit and scope of the invention is defined by the following claims, to be interpreted in light of the above description.

I claim:

1. In a network-based telephone system comprising a first and second telecommunications device, the first telecommunications device being operable to generate voice signals and dual-tone multi-frequency (DTMF) signals in an audio signal, the first and second telecommunications devices being connected to a packet-based network, a method for efficiently transmitting the audio signal to the second telecommunications device, the method comprising the steps of:
    detecting if the audio signal includes at least one DTMF signal;
    generating an audio delay when the audio signal includes the DTMF signal;
    creating an audio stream using the audio signal;
    transporting the audio stream without the audio delay when the audio signal does not include the DTMF signal;
    when the audio stream includes the DTMF signal, creating a separate DTMF stream using the DTMF signals in the audio signal;
    transporting the DTMF stream and the audio stream on the packet-based network with the audio delay; and
    decoding the DTMF and audio streams from the packet-based network to create a received audio signal, and to transmit the received audio signal to the second telecommunications device.

2. The method of claim 1 further comprising the step of, prior to the step of creating the audio stream, removing the DTMF signals from the audio signal when the audio stream includes at least one DTMF signals.

3. The method of claim 2 wherein the step of detecting if the audio signal includes at least one DTMF signal comprises the steps of analyzing the audio signal for the presence of a first DTMF signal.

4. The method of claim 3 further comprising the step of in the removing step, waiting to remove the DTMF signals until the audio delay is long enough to permit detection and removal of the DTMF signals before the DTMF signals are included in the audio stream.

5. The method of claim 4 further comprising the step of permitting at least the first DTMF signal to be transported over the audio stream if the audio delay is not long enough to permit detection and removal of the DTMF signals.

6. The method of claim 5 further comprising the steps of:
    detecting whether the first DTMF signal is transmitted in the audio stream before the audio delay is sufficiently long to permit detection and removal of DTMF signals; and
    playing a warning message to the first telecommunications device if the first DTMF signal is transmitted in the audio stream.

7. The method of claim 1 wherein the step of detecting if the audio signal includes at least one DTMF signal comprises the steps of analyzing the audio signal for the presence of a first DTMF signal.

8. The method of claim 1 wherein the network-based telephone system includes a first gateway connected to the first telecommunications device and the packet-based network and a second gateway connected to the second telecommunications device and the packet-based network, the method further comprising the steps of:
    at the first gateway, initiating a virtual call connection for communicating the audio signal by the steps of:
        receiving a dialing audio signal comprising a first sequence of DTMF signals, the first sequence of digits representing a destination telephone number, decoding the destination telephone number;
        establishing a network connection to the second gateway for transporting the destination telephone number over the packet-based network; and
    completing the virtual call connection at the second gateway by the steps of connecting the virtual call connection to the second telecommunications device using the destination telephone number.

9. The method of claim 8 wherein the step of detecting whether the audio signal includes the DTMF signal comprises the steps of:
    determining whether the destination telephone number is used by a party that communicates using DTMF signals during an initial period of the virtual call connection by the steps of:
        retrieving a destination type from the first gateway for the destination telephone number; and
        indicating that the audio signal includes at least one DTMF.

10. The method of claim 9 further comprising the step of removing the audio delay when the virtual call connection has reached a duration substantially equal to the initial period.

11. The method of claim 8 further comprising the step of retrieving a calling telephone number for the first telecommunications device, wherein:
    the step of determining whether the audio signal includes at least one DTMF signals during an initial period of the virtual call connection further comprises the steps of:

retrieving a destination type from the first gateway for the calling telephone number; and indicating that the audio signal includes at least one DTMF.

12. The method of claim 11 further comprises the step of removing the audio delay when the virtual call connection has reached a duration substantially equal to the initial period.

13. The method of claim 8 wherein the step of detecting the DTMF signals comprises the steps of:

determining whether the destination telephone number is used by a supplementary service that communicates using DTMF signals by the steps of:

retrieving a destination type from the first gateway for the destination telephone number; and indicating that the audio signal includes at least one DTMF.

14. The method of claim 1 wherein the step of transporting the DTMF stream and the audio stream with the audio delay comprises the steps of:

initiating the audio delay in the audio stream by setting the audio delay to a short delay; and gradually increasing the audio delay until the audio delay permits detection and removal of DTMF signals from the audio signal.

15. The method of claim 1 further comprising the steps of:

monitoring the audio signal for a plurality of additional DTMF signals; and removing the audio delay from the audio stream when no additional DTMF signals are detected for a selected time limit.

16. The method of claim 1 further comprising the steps of:

continually sensing the audio signal to detect DTMF signals while the first telecommunications device communicates the audio signal to the second telecommunications device;

tracking the audio signal to determine a no-DTMF time period during which no DTMF signals are detected; and when the no-DTMF time period reaches a selected time limit, removing the audio delay from the audio stream.

17. A network-based telephone system for connecting a first telecommunications device and a second telecommunications device over a packet-based network, the system comprising:

a first gateway comprising:

a telephone network interface for receiving an audio signal from the first communications device via a public switched telephone network over a virtual call connection between the first and second telecommunications devices;

a dual-tone multi-frequency (DTMF) and audio controller for detecting a DTMF signal in the audio signal, for removing the DTMF signal from the audio signal and for generating a delay in the audio signal;

an audio encoder for creating an audio stream for transporting the audio signals over the packet-based network; and a network interface for converting the audio stream into an audio session and transporting the audio stream over the packet-based network; and a second gateway for receiving the audio sessions, the second gateway being communicably connected to the second communications device via a second telephone network interface, the second gateway being operable to translate the audio session into a received audio signal and to transmit the received audio signal to the second communications device.

18. The system of claim 17 wherein the first gateway further comprises a DTMF decoder for creating a DTMF stream and wherein the network interface converts the DTMF stream into a DTMF session for transporting the DTMF stream over the packet-based network.

19. The system of claim 17 wherein the DTMF/audio controller comprises a DTMF detector for detecting the DTMF signals.

20. The system of claim 17 wherein the DTMF/audio controller comprises a variable delay generator for imposing the delay on the audio signal when the DTMF signal is detected in the audio signal.

21. The system of claim 18 wherein the second gateway further comprises:

a network receiver for receiving the audio and DTMF sessions from the packet-based network and for creating a received audio stream from the audio session and a received DTMF stream from the DTMF session;

a DTMF/audio multiplexer for integrating the DTMF stream to the audio stream to a received audio signal; and a receiver telephone network interface for transmitting the received audio signal to the second communications device.

22. The system of claim 17 wherein the first gateway further comprises:

a timer for timing time periods after the detection of DTMF signals; and a delay eliminator for removing the delay when one of the time periods reaches a selected time limit.

23. A network-based telephone system for connecting a first telecommunications device and a second telecommunications device over a packet-based network, the system comprising:

a first gateway comprising:

a telephone network interface for receiving an audio signal from the first communications device via a public switched telephone network;

a call process driver for creating a virtual call connection for communicating the audio signal, the call process driver comprising a prompter for prompting a user of the first telecommunications device for call setup information, the call setup information including a destination number and whether the destination number is of a type that includes DTMF signals during an initial period of the virtual call connection;

a dual-tone multi-frequency (DTMF) and audio controller for removing the DTMF signal from the audio signal and for generating a delay in the audio signal;

an audio encoder for creating an audio stream for transporting the audio signals over the packet-based network; and a network interface for converting the audio stream into an audio session and transporting the audio stream over the packet-based network; and a second gateway for receiving the DTMF and audio sessions, the second gateway being communicably connected to the second communications device via a second telephone network interface, the second gateway being operable to translate the audio session into a received audio signal and to transmit the received audio signal to the second communications device.

24. The system of claim 23 wherein the first gateway further comprises a DTMF decoder for creating a DTMF stream and wherein the network interface converts the DTMF stream into a DTMF session for transporting the DTMF stream over the packet-based network.

25. The system of claim 23 wherein the DTMF/audio controller comprises a DTMF detector for detecting the DTMF signals.

26. The system of claim 23 wherein the DTMF/audio controller comprises a variable delay generator for imposing the delay on the audio signal when the call process driver determines that the destination number uses DTMF signals.

27. The system of claim 24 wherein the second gateway further comprises:
   a network receiver for receiving the audio and DTMF sessions from the packet-based network and for creating a received audio stream from the audio session and a received DTMF stream from the DTMF session;
   a DTMF/audio multiplexer for integrating the DTMF stream to the audio stream to a received audio signal; and
   a receiver telephone network interface for transmitting the received audio signal to the second communications device.

28. The system of claim 23 wherein the first gateway further comprises:
   a timer for providing a duration of the virtual call connection; and
   a delay eliminator for removing the delay when the duration of the virtual call connection has reached the initial period.

29. A network-based telephone system for connecting a first telecommunications device and a second telecommunications device over a packet-based network, the system comprising:
   a first gateway comprising:
      a telephone network interface for receiving an audio signal from the first communications device via a public switched telephone network;
      a call process driver for creating a virtual call connection for communicating the audio signal, the call process driver comprising a prompter for prompting a user of the first telecommunications device for call setup information, the call setup information including a calling party number and whether the calling party number is of a type that includes DTMF signals during an initial period of the virtual call connection;
      a dual-tone multi-frequency (DTMF) and audio controller for removing the DTMF signal from the audio signal and for generating a delay in the audio signal;
      an audio encoder for creating an audio stream for transporting the audio signals over the packet-based network; and
      a network interface for converting the audio stream into an audio session and transporting the audio stream over the packet-based network; and
   a second gateway for receiving the audio sessions, the second gateway being communicably connected to the second communications device via a second telephone network interface, the second gateway being operable to translate the audio sessions into a received audio signal and to transmit the received audio signal to the second communications device.

30. The system of claim 29 wherein the first gateway further comprises a DTMF decoder for creating a DTMF stream and wherein the network interface converts the DTMF stream into a DTMF session for transporting the DTMF stream over the packet-based network.

31. The system of claim 29 wherein the DTMF/audio controller comprises a DTMF detector for detecting the DTMF signals.

32. The system of claim 29 wherein the DTMF/audio controller comprises a variable delay generator for imposing the delay on the audio signal when the call process driver determines that the calling party uses DTMF signals.

33. The system of claim 30 wherein the second gateway further comprises:
   a network receiver for receiving the audio and DTMF sessions from the packet-based network and for creating a received audio stream from the audio session and a received DTMF stream from the DTMF session;
   a DTMF/audio multiplexer for integrating the DTMF stream to the audio stream to a received audio signal; and
   a receiver telephone network interface for transmitting the received audio signal to the second communications device.

34. The system of claim 29 wherein the first gateway further comprises:
   a timer for providing a duration of the virtual call connection; and
   a delay eliminator for removing the delay when the duration of the virtual call connection has reached the initial period.

* * * * *